United States Patent
Chen

(10) Patent No.: US 9,497,134 B1
(45) Date of Patent: Nov. 15, 2016

(54) METHODS AND APPARATUS FOR TRAFFIC MANAGEMENT IN MULTI-MODE SWITCHING DWDM NETWORKS

(71) Applicant: Yuhua Chen, Houston, TX (US)

(72) Inventor: Yuhua Chen, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 0 days.

(21) Appl. No.: 14/791,679

(22) Filed: Jul. 6, 2015

(51) Int. Cl.
| | |
|---|---|
| *H04B 10/00* | (2013.01) |
| *H04L 12/863* | (2013.01) |
| *H04Q 11/00* | (2006.01) |
| *H04J 14/02* | (2006.01) |
| *H04J 14/00* | (2006.01) |

(52) U.S. Cl.
CPC ......... *H04L 47/625* (2013.01); *H04J 14/0221* (2013.01); *H04L 47/626* (2013.01); *H04Q 11/0066* (2013.01); *H04Q 2011/0016* (2013.01); *H04Q 2011/0064* (2013.01); *H04Q 2011/0092* (2013.01)

(58) Field of Classification Search
CPC .................................................. H04Q 11/0066
See application file for complete search history.

(56) References Cited

U.S. PATENT DOCUMENTS

| | | | |
|---|---|---|---|
| 6,721,315 B1* | 4/2004 | Xiong | H04L 49/254 370/389 |
| 2003/0099243 A1* | 5/2003 | Oh | H04Q 11/0066 370/395.21 |
| 2010/0021165 A1* | 1/2010 | Nuzman | H04J 14/0227 398/75 |

* cited by examiner

*Primary Examiner* — Daniel Dobson
(74) *Attorney, Agent, or Firm* — Winstead PC

(57) ABSTRACT

A Wavelength Division Multiplexing (WDM) multi-mode switching system and method and method provides concurrent switching in various switching modes including, but not limited to, an electronic packet switching (EPS) mode, optical circuit switching (OCS) mode, and optical burst switching (OBS) mode. Edge routers in the WDM multi-mode switching systems may provide a traffic management module that processes incoming data and routes the data for transmission in an electronic packet switching (EPS), optical burst switching (OBS), or optical circuit switching (OCS) modes via a WDM link.

18 Claims, 18 Drawing Sheets

METHODS AND APPARATUS FOR TRAFFIC MANAGEMENT IN MULTI-MODE SWITCHING DWDM NETWORKS

STATEMENT REGARDING FEDERALLY SPONSORED RESEARCH

This invention was made with government support under Grant Nos. CNS-0708613, CNS-0923481 and ECCS-0926006 awarded by the National Science Foundation. The government has certain rights in the invention.

RELATED APPLICATIONS

This application is a divisional of U.S. Nonprovisional application Ser. No. 13/434,597, filed Mar. 29, 2012, which claims the benefit of U.S. Provisional Patent Application No. 61/469,337, filed on Mar. 30, 2011, which are incorporated herein by reference.

FIELD OF THE INVENTION

The present invention relates to a method for enhancing traffic management in optical networks. More specifically, the present invention enables efficient dynamic packet traffic management in Dense Wavelength Division Multiplexing (DWDM) networks.

BACKGROUND OF INVENTION

With the advent of 10 Gigabit Ethernet and Fiber-to-the-Home (FTTH) with the Passive Optical Network (PON), residential user data rate is expected to exceed 100 Mb/s in the near future, and over 1 Gb/s in the long term, while enterprise users will enjoy 10 Gb/s connectivity. In addition, data-intensive users are expected to have 10 to 100 TB data sets to be delivered within 24 hours. To scale the Internet over existing network infrastructure, Dense Wavelength Division Multiplexing (DWDM) technology has made it possible to carry hundreds of wavelength channels over a single optical fiber at rates of 10 Gb/s and beyond. DWDM transmission has been widely deployed in long haul service provider networks, and is increasingly being deployed in metro service provider networks and for enterprise data center connectivity applications. In addition, WDM PON can deliver dedicated (unshared) bandwidth of over 1 Gb/s to residential users. DWDM has become the technology of choice for communication networks. While DWDM is universally used in transmission, different switching technologies can be used to direct input data to the output at router nodes. Current switching technologies can be characterized into electronic switching and optical switching technologies based on how data is processed in the router.

Electronic switching technology, also known as electronic packet switching (EPS), converts DWDM optical signals to electronic signals, and processes data (usually in the form of packets) electronically. After packets are routed to the destined output, they are converted back to an optical signal, and sent on DWDM links toward the downstream router. However, as the number of DWDM channels increases, the optical/electrical/optical (O/E/O) conversion required by electronic switching adds significantly to the overall system cost. For example, while it is technologically feasible to carry 512 wavelengths in a single optical fiber, it requires 512 O/E/O pairs in EPS routers, just to terminate a single DWDM link.

Optical switching technologies, on the other hand, allow DWDM channels to pass the router node optically, greatly reducing the cost to deploy DWDM channels over existing network infrastructure. Optical switching can be further divided into 3 technologies: a) Optical circuit switching (OCS), b) Optical packet switching (OPS), and c) Optical burst switching (OBS). In OCS, switching decisions are made at the wavelength level, and data passes through routers along pre-established lightpaths. Although the technology has been available for the past several years, its deployment has been slow due to its coarse granularity which limits its application in supporting dynamic traffic. OPS overcomes this limitation in that it is to switch packet level data optically. It is unlikely that OPS will be available in the foreseeable future, largely due to the lack of random access optical buffers, and the synchronization issues associated with the packet header and payload. OBS provides a granularity between optical circuit switching and optical packet switching. It allows the control header to establish an optical data path before data arrives at the optical switching fabric so that no optical buffer is needed. In addition, the decoupling of the control header and the data (burst) also bypasses the synchronization problem that OPS experiences. Currently, OBS is considered the most promising optical switching technology.

Unfortunately, there is no single switching technology that can scale cost-effectively with the number of DWDM channels while meeting the diverse needs of heterogeneous applications. Internet traffic may be heterogeneous, embracing all the data generated by applications that differ greatly in nature (e.g., VoIP, Video-on-Demand (VoD)), IPTV, 3G/WiMax, Virtual-Private-Network (VPN), and 10 Gigabit Ethernet). It seems that no single switching technology (EPS, OCS or OBS) can claim victory over all applications. Although optical switching technologies have advantages for scaling up DWDM systems, neither OCS nor OBS can switch at the packet level. However, fine packet level granularity is desirable when transporting short, latency sensitive messages, such as TCP (Transmission Control Protocol) acknowledgements. Even between the two optical switching technologies, OCS and OBS, it is hard to declare a winner for all types of applications. While it is clear that OBS performs well for most of bursty Internet traffic, OCS is more suitable for applications such as high energy physics that require sustained, long-term full channel bandwidth (i.e. 10 Gb/s and above). OCS is also a better fit for mission critical applications which cannot tolerate any data loss or delay. One can always build separate networks using different switching technologies to meet the respective needs of applications. However, for some applications, this implies a higher capital investment, separate management issues for each type of networks, and less flexibility; for others, unfortunately, there is no single type of network that can best fit the need for the application because of the characteristics of different types of messages within the application. Although attempts have been made to support specific applications in the network, none of them address the DWDM channel scaling issue.

In order to solve the dilemma, with both the applications and cost of system scaling in mind, an approach for traffic management in DWDM-based communication networks is discussed herein. The approach enables dynamic packet traffic management in DWDM networks.

SUMMARY OF THE INVENTION

Methods and apparatuses for traffic management discuss herein provide traffic management in multi-mode switching DWDM networks with fine granularity. These methods and apparatuses provide dynamic packet services in DWDM networks. These methods and apparatuses provide an optical router that supports dynamic traffic management at packet granularity. Edge routers in the DWDM multi-mode switching systems may provide a traffic management module that processes incoming data and routes the data for transmission in an electronic packet switching (EPS), optical burst switching (OBS), or optical circuit switching (OCS) modes via a DWDM link.

In one illustrative implementation, an edge router system for multi-mode switching comprises a traffic management module receiving data from one or more sources. The traffic management module comprises a multi-mode packet processor receiving said data that processes it for transmission in EPS, OBS, and/or OCS modes. An EPS mode processor may receive a first portion of the data from the packet processor, wherein the EPS mode processor assembles the first portion of data for transmission in an EPS mode on a first wavelength. An OBS mode processor may receive a second portion of the data from the packet processor, wherein the OBS mode processor assembles the second portion of data into burst for transmission in an OBS mode on a second wavelength. An OCS mode processor may receive a third portion of the data from the packet processor, wherein the OCS mode processor transmits the third portion of data in an OCS mode on a third wavelength. A switching control coupled to the multi-mode packet processor generates control packets for EPS, OCS, and OBS data. A multiplexer combines the control packets and the EPS, OCS, and OBS data for output to a WDM link.

In another illustrative implementation, a method for multi-mode edge routing comprising receiving data from one or more sources at an edge router for transmission via a WDM link. A first portion of the data may be routed to an electronic packet switching (EPS) mode processor that assembles the first portion of data in an EPS mode on a first wavelength. A second portion of the data may be routed to an optical burst switching (OBS) mode processor that assembles the second portion of data into burst for transmission in an OBS mode on a second wavelength. A third portion of the data may be routed to an optical circuit switching (OCS) mode processor that transmits the third portion of data in an OCS mode on a third wavelength. The EPS, OBS, and OCS data are combined for output to a WDM link.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
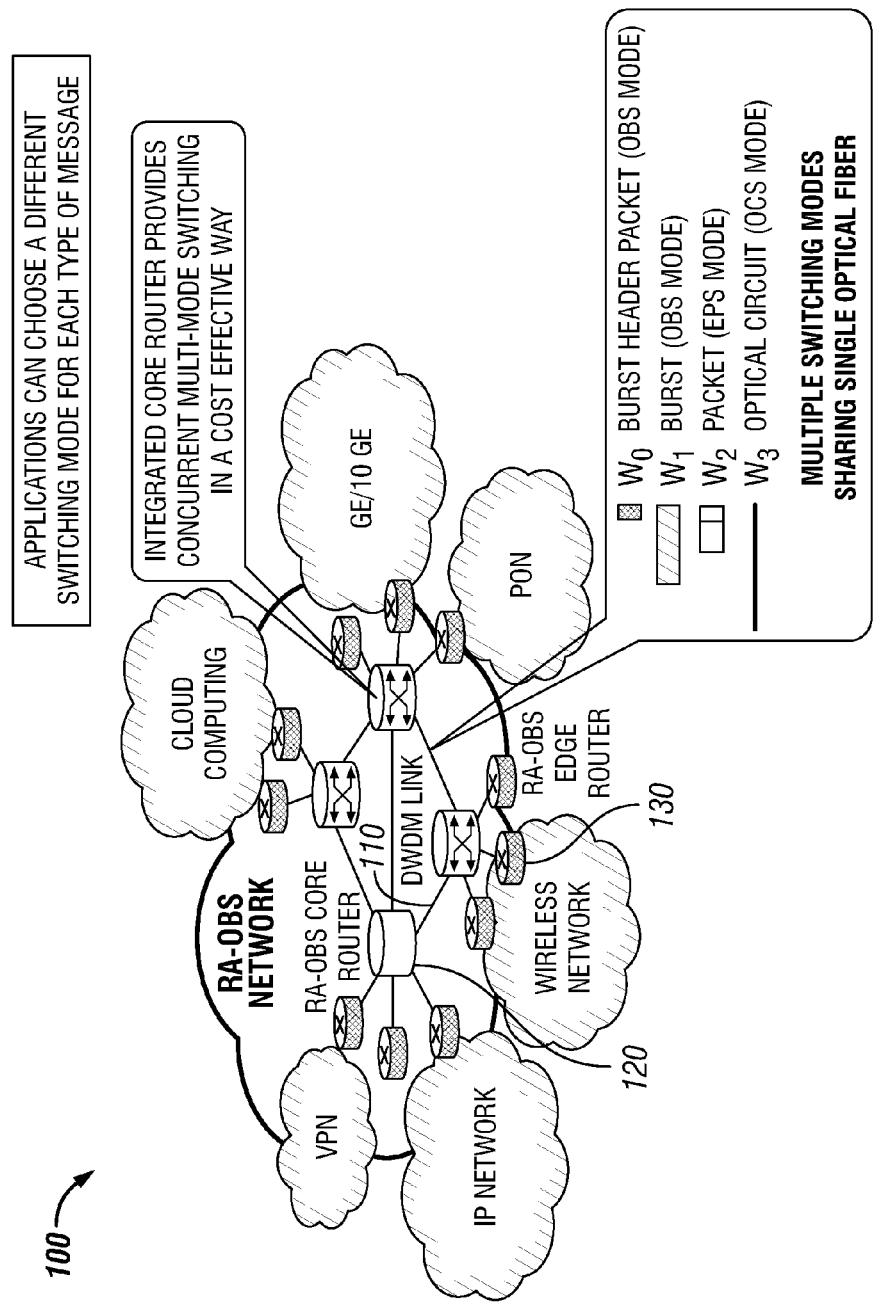
FIG. 1 is an illustrative implementation of Reconfigurable Asymmetric Optical Burst Switching (RA-OBS) network architecture.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Combined with Erbium doped fiber amplifiers, DWDM has dramatically improved bandwidth distance, providing huge reductions in the cost per bit per mile of transmission. DWDM is becoming the universal standard in transmission. Today there are two primary switching technologies, namely, electronic switching and optical switching. These switching technologies are discussed herein.

Electronic Packet Switching (EPS) Technology

Electronic Packet Switching (EPS) converts DWDM signals back to electrical signals and processes data on a packet-by-packet basis. In general, EPS routers can be categorized into Input Queued (IQ) switches, Output Queued (OQ) switches, and Combined Input-Output Queued (CIOQ) switches based on where packets are buffered. In an IQ switch, packets are buffered at input ports and a crossbar switch fabric is used. In a given time slot, an input of an IQ switch can send out at most one packet, and an output can receive at most one packet. In an OQ switch, packet buffers are placed at the output ports. All packets arriving at input ports are immediately transferred to their respective output ports. Unfortunately, an OQ switch requires that the internal switching fabric operates at a speedup of N, where N is the number of ports of the router. Therefore, an OQ switch is not scalable. In a CIOQ switch, packet buffers are placed at both input and output ports. The switching fabric operates with a speedup, which allows up to S packets to be transferred from an input and up to S packets to be received by an output in each time slot.

In an ideal OQ switch, a packet only contends for bandwidth with packets buffered at the same output port. Fair scheduling in the context of a single server has been widely studied. Weighted Fair Queuing (WFQ) and its packetized implementation have been shown to be a good approximation of Generalized Processor Sharing (GPS). Deficit Weighted Round Robin (DWRR) provides a computationally efficient version of WFQ. However, the above results cannot be immediately extended to IQ or CIOQ switches due to scheduling constraints. It has been shown that CIOQ with a speedup of 2 is necessary and sufficient for emulating an OQ switch under various policies such as FIFO, WFQ, DWRR, etc. However, the prevalence of DWDM has enabled transmission rate at 10 Gb/s, 40 Gb/s, and potentially at 160 Gb/s. At these transmission rates, even a CIOQ with a speedup of 2 is not practical due to the high electronic buffer speeds required. Parallel Packet Switch (PPS) uses multiple identical lower-speed packet switches operating independently and in parallel to reduce the buffer bandwidth requirement on individual packet switches. In addition to the electronic buffer speed, the above approaches require a centralized scheduler. Although several scheduling algorithms can provide a guaranteed throughput of 50% to 100%, these centralized scheduler based schemes become impractical as the number of DWDM channels grows, because of their scheduling complexity and/or the speedup of the buffer memory. The load balanced switch avoids the centralized packet scheduler and can support a large number of linecards. Unfortunately, the cost for optical/electrical/optical (O/E/O) conversion in electronic packet switching becomes the limiting factor for scaling to a large number of DWDM channel.

Optical Switching Technologies

Optical Circuit Switching (OCS)

Optical circuit switching is realized in practice in various forms such as Optical Add/Drop Multiplexers (OADMs), Reconfigurable OADMs (ROADMs), and Wavelength Routers. OADMs and ROADMs allow one or more wavelengths to be added or dropped at a node. Wavelengths to be added or dropped are fixed in OADMs and can be reconfigured in ROADMs. However, OADMs or ROADMs can only be used to construct linear or ring network topologies and are not suitable for building mesh network architecture. A wavelength router can switch wavelengths among multiple incoming and outgoing fibers and can be used to build mesh networks. The coarse granularity, however, restricts the wavelength routers to core networks where optical connections are provisioned to last for months or years. Additionally, connections are needed, just to connect edges, which is not scalable to the Internet size. Research in OCS is focused on circuit connection blocking analysis, routing and wavelength assignment (RWA), and traffic grooming. Traffic grooming is a technique that allows lower-speed traffic such as STS-1 (51.94 Mb/s), OC-3, OC-12 and OC-48 to share lightpaths either statically or dynamically. However, as 10 Gigabit Ethernet becomes increasingly popular, benefits of traffic grooming diminish.

Optical Packet Switching (OPS)

Optical packet switching intends to switch packets and has the finest granularity among all forms of optical switching. In optical packet switching, the packet payload is buffered optically while the packet header is converted to electronic signals and processed electronically at each node. When two packets contend for an output, one of them needs to be buffered optically. Both factors—storing optical payload during header processing and buffering optical packets for contention resolution—require optical buffers. Unfortunately, current optical buffers do not provide random access. The only way to provide limited delays in the optical domain is through Fiber Delay Lines (FDLs). Time delays to the optical payload are achieved either through the use of FDLs of varying lengths, or through the use of a fiber delay loop where the optical data to be stored circulates through the loop a number of times. The lack of optical random access memory severely degrades the performance of optical packet switching. In addition, implementing FDLs at the scale needed is not practical. For example, a 1 microsecond delay would require over 1000 feet of FDLs. The synchronization between the packet header and its payload is another serious concern in optical packet switching. After the packet header is processed, it is converted to optical signals and needs to be combined with the optical payload. Synchronizing the header and the payload is a challenging task that has not been yet accomplished beyond the research laboratory.

Optical Burst Switching (OBS)

Optical burst switching is an emerging core switching technology that allows variable size data bursts to be transported over DWDM links. In order to reduce the switching overhead at the core nodes, the ingress edge node aggregates packets from a number of sources destined for the same egress node dynamically to form a large data burst. An optical path is created on the fly to allow data bursts to stay in the optical domain and pass through the core routers transparently. This is achieved by launching a burst header on a separate control channel ahead of the data burst and setting up the optical path prior to the arrival of the data burst. Since OBS is a relatively new field, discussion of several important aspects is provided herein.

OBS Signaling Protocol:

The Just-Enough-Time (JET) OBS signaling protocol allows the OBS core routers to use delayed reservations by calculating the projected future burst arrival time and the burst release time using the information carried in the burst header. As a result, the OBS core router can manage the wavelength resources efficiently by reserving the wavelength only for the duration of the burst. While the JET protocol is the prevailing protocol used for OBS, the other notable OBS signal protocol is Just-In-Time (JIT). Compared to JET, JIT reserves the channel bandwidth when a setup message is received, not when the data burst is to arrive, and, therefore, is less efficient in terms of bandwidth usage. It was originally believed that the JIT protocol with instant reservations would be easier to implement than the JET protocol with delayed reservations. However, it has been demonstrated that several channel scheduling algorithms based on the JET protocols are very efficient.

Burst Assembly:

The OBS ingress edge router aggregates packets into bursts before forwarding them to the core network. This process is called burst assembly. Bursts are assembled based on the destination edge routers. A burst is formed when either of the following conditions is met: (1) the size of the assembling burst reaches the burst length threshold; or (2) the timer expires. The timeout value restricts the burst assembly latency and is especially useful under light traffic loads. Bursts usually reach the burst length threshold before the timer expires under heavy traffic loads. Although the threshold only or timer only burst assembly policies have been discussed, the mixed burst assembly scheme described above works well under both light and heavy traffic loads without much implement overhead. The mixed burst assembly scheme is considered as the default scheme for OBS. Based on some variations of burst protocols, burst connections are established by sending an explicit burst setup request, and are torn down by sending an explicit burst teardown request.

Burst Scheduling:

In OBS networks, the core routers set up optical paths on the fly, based on the information carried in the burst headers. This requires an online burst scheduling algorithm that can support a large number of wavelength channels. The major burst scheduling algorithms are discussed below. Horizon scheduling maintains a single status for each wavelength and is efficient to implement, but it suffers from low link utilization. The LAUC-VF (latest available unscheduled channel with void filling) keeps track of the voids (gaps) on each wavelength and has high link utilization. The complexity of LAUC-VF is O(m), where m is the total number of voids. Min-SV (Minimum Starting Void) is a more efficient implementation of LAUC-VF which uses a geometric approach by organizing the voids into a balanced binary search tree. The complexity of Min-SV algorithm is O(log m). However, Min-SV has large memory access overhead for each burst scheduling request. It turns out that the voids are caused by the variable offset times between the burst headers and bursts.

Supporting Quality-of-Service (QoS) in OBS:

The offset-based QoS scheme assigns a larger offset time to higher priority bursts. However, offset-based QoS favors shorter length bursts and has longer delay for higher priority bursts. Intentional Burst Dropping and Burst Early Dropping intentionally drop low priority bursts, therefore, suffer from high overall burst loss probability. Wavelength grouping guarantees worst-case burst loss probability for each service class at the expense of elevated overall burst loss probability by restricting the use of wavelengths for each priority class. The Look-Ahead Window (LaW) resolves burst contention by constructing a window of W time units and makes collective decisions on burst dropping. LaW only drops a burst when contention is identified. However, the algorithm has high computational complexity. The Contour-based Priority (CBP) algorithm achieves O(1) runtime complexity yet inherits the optimal burst scheduling properties in, and is suitable for practical realization in OBS networks.

To summarize, OBS provides an effective means to realize dynamic DWDM networks. However, it still has coarse granularity compared to packet switching as a burst is a collection of hundreds or thousands of packets.

Methods and apparatuses for enhancing traffic management in optical networks are discussed herein. More specifically, these methods and apparatuses enable efficient dynamic packet traffic management in Dense Wavelength Division Multiplexing (DWDM) networks.

These methods and apparatuses allow dynamic traffic to receive packet level services in any of three switching modes: EPS, OCS, and OBS modes. The methods and apparatuses minimize the drawbacks of using only one switching mode. Various embodiments that disclose the basic operations of the current invention are explained as follows.

While the packet switching technologies discussed herein identify several methods, processes, and/or schemes that may be utilized, they are provided for illustrative purposes. Thus, it is noted that the traffic management methods and apparatuses discussed herein are in no way limited to the examples methods, processes, and/or schemes discussed herein. It will be recognized by one of ordinary skill in the art that any suitable methods, processes, and/or schemes known in the art of switching technologies maybe utilized with the traffic management methods and apparatuses discussed herein.

The Multi-Mode Switching DWDM network architecture provides a set of multi-mode switching edge routers and core routers connected by DWDM links. Each wavelength in a DWDM link can be individually configured in the electronic packet switching (EPS), optical circuit switching (OCS) or optical burst switching (OBS) mode. The most suited switching mode can be used to transport individual applications, as well as individual message types within an application. More importantly, the architecture provides a cost effective way to scale the number of DWDM channels by maintaining a relatively small number of costly electronic switching ports. In addition, legacy optical switching networks can interface with the proposed DWDM network directly by setting the wavelengths in the fiber to be in the OCS mode.

Concurrent DWDM Multi-Mode Switching:

A multi-mode router can be configured such that all three modes can be concurrently supported in the multi-mode switching core router. For example, four wavelengths $w_0$-$w_3$ can be configured in different modes in the same incoming optical fiber connected to Port 1 of the core router. Wavelength $w_0$ is the control wavelength in the OBS mode to carry burst header packets. Wavelength $w_1$ is the data wavelength in the OBS mode to carry data bursts. Wavelength $w_2$ is set in the EPS mode and is used to carry packets which are switched electronically. Wavelength $w_3$ is in the OCS mode, and any data sent on that wavelength will follow the pre-established lightpath in the optical switching fabric to the desired output. Each of the four wavelengths is switched based the operation of the particular switching mode described above. The outgoing wavelengths may be combined at the output onto the optical fiber. Additional discussion of concurrent DWDM Multi-Mode Switching is provided in U.S. application Ser. No. 13/325,544 filed on Dec. 14, 2011, which is incorporated by reference herein.

In the traffic management systems and methods, packet level management is achieved in multi-mode switching DWDM networks. A multi-mode traffic management module provides packet services through EPS connections, OBS connections, and OCS connections. Packets sent over an EPS connection are single-packet entities, and the optical connections are terminated at the downstream router for potential route lookups. Packets sent over an OBS connection share the same egress edge router addresses. An OBS connection can be set up for certain durations to handle dynamic traffic for a special event, a large file transfer, a collection of user applications, etc. Optical paths set by the OCS mode are relatively long lasting connections that assume infinite lengths until explicit disconnection occurs. In the traffic management system, one embodiment utilizes an integrated multi-mode traffic management module to provide traffic management to all supported switching modes by treating the EPS and the OCS modes as special cases of the OBS mode with variable durations. This unified approach provides tremendous benefits where traffic management schemes can be dynamically changed based on current traffic patterns.

FIG. 1 is an illustrative implementation of a reconfigurable asymmetric optical burst switching (RA-OBS) network 100 providing a set of RA-OBS edge router(s) 130 and RA-OBS core router(s) 120 connected by DWDM link(s) 110. RA-OBS edge routers 130 may interface with various networks including, but not limited to, virtual private networks (VPN), IP networks, wireless networks, passive optical networks (PON), Gigabit Ethernet (GE)/10 GE, cloud computing, or the like. In the RA-OBS network 100, each wavelength in a DWDM link can be individually configured for EPS, OCS or OBS modes. RA-OBS core router 120 switches data based on the mode configured for a given wavelength, and routes data accordingly. More specifically, a wavelength configured in the EPS mode is switched electronically on a packet by packet basis by the core router; a wavelength in the OCS mode is switched at the wavelength level using optical circuit switching; and a wavelength in the OBS mode is switched according to optical burst switching protocols. An application can choose a switching mode that is best suited for the characteristics of the entire application or vary switching modes for each message type within the application.

Another embodiment is to implement different adaptive schemes under the current invention to achieve integrated dynamic services. At the multi-mode switching ingress edge router, packets may be received on different line interfaces such as IP, Gigabit Ethernet (GE)/10 GE, etc. and may be classified for processing into a desired mode (EPS, OCS, or OBS modes) by a traffic management module. Classification can be performed at the packet level or based on specific settings such as a particular line interface. Based on the results from the classifier and dynamic traffic management schemes enabled in the dispatcher, the packets or traffic streams will be processed according to one of the following switching modes: (1) EPS mode—Packets sent in the EPS mode are queued and transmitted in the EPS packet processor; (2) OCS mode—Traffic streams in the OCS mode are sent on pre-established lightpaths via the OCS manager; (3) OBS mode—Packets or flows in OBS mode are assembled into bursts based on the destination edge router address and sent according to OBS protocols. The integrated multi-mode traffic management module is responsible for dynamic multi-mode reconfiguration and signaling protocols for individual switching modes. All wavelengths are combined onto the outgoing DWDM link.

The traffic management systems and methods allow dynamic traffic to receive packet level services in any of the three switching modes, the EPS mode, the OCS mode, and the OBS mode, greatly reducing the need for pure EPS mode service, which is relatively expensive due to O/E/O conversion. In one embodiment, the packets are dispatched to one of the three switching modes according to dynamic traffic conditions. As a result, the switching mode for a particular packet is not fixed until the transmission time, which can be in the EPS, OCS or OBS mode. The packets are tagged to be sent in one of the three switching modes after classification.

RA-OBS network 100 has the following characteristics:

Multimodal: The multimodal switching is provided for by the novel systems and methods discussed herein. Each individual DWDM wavelength channel may be allocated for a different switching mode, thereby allowing multiple switching modes to be utilized simultaneously. Each fiber can transmit multiple wavelengths, each utilizing different switching modes, to allow data to be transferred using multiple switching modes.

Reconfigurability: The reconfigurability comes from the fact that each individual DWDM wavelength channel in the proposed architecture can be reconfigured to carry traffic in different switching modes. In addition, the number of wavelengths in each fiber used for EPS, OCS and OBS can be dynamically reconfigured based on specific traffic demands.

Asymmetry: The asymmetry is due to the fact that in a two-way communication, different switching modes can be used in different directions to provide the best performance, taking into account the characteristics of the data in each direction. For example, in telesurgery applications, the OBS or OCS mode can be used for transferring medical quality 3D video from the patient site to the remote surgeon site, while using the EPS mode for short robot control messages from the remote surgeon site to the patient site.

Figure 2:
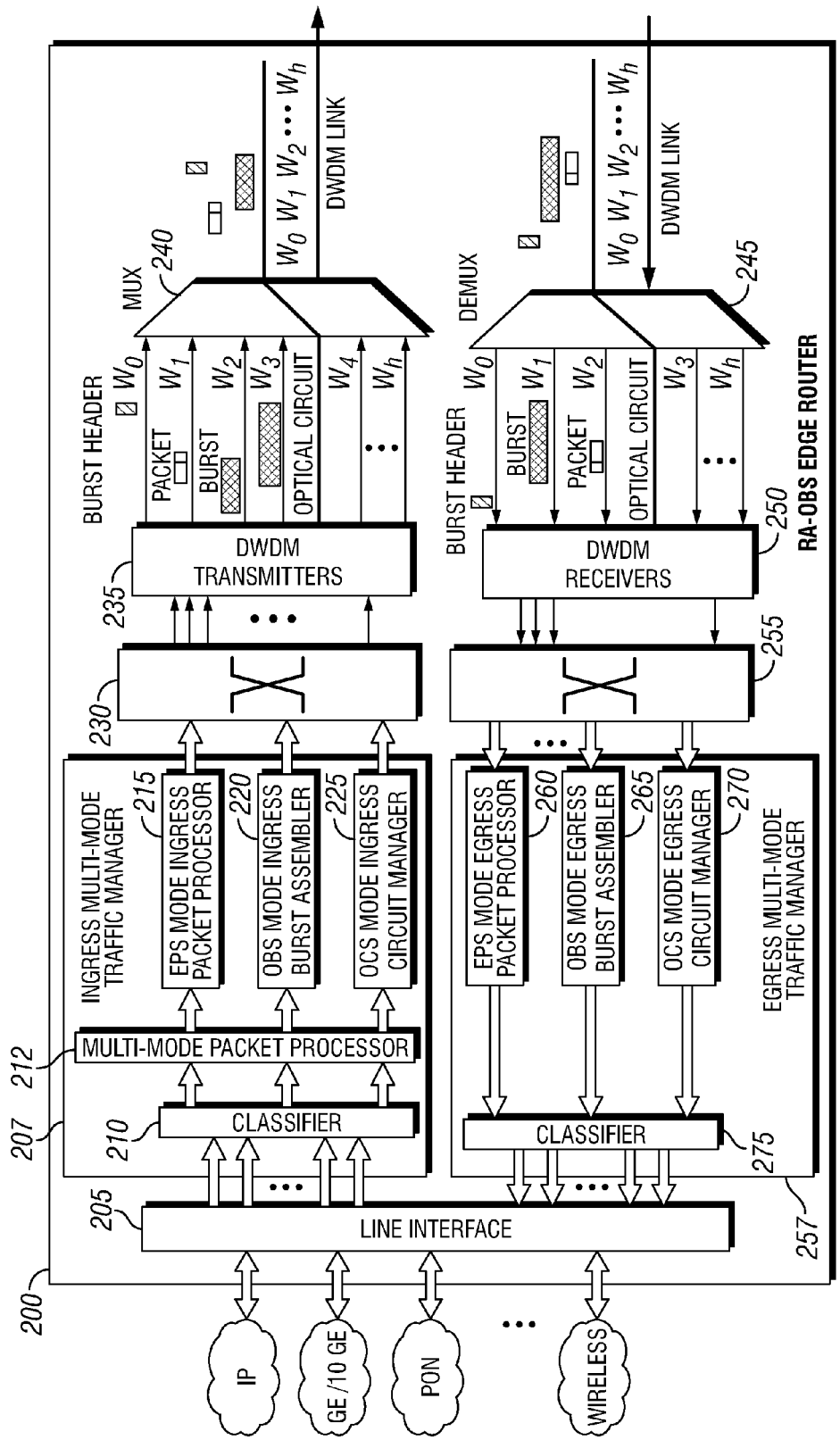
FIG. 2 is an illustrative implementation of a RA-OBS edge router architecture.

FIG. 2 is an illustrative implementation of an architecture for a RA-OBS edge router 200. In the ingress direction, packets may be received from various networks by line interface 205 and are sent to ingress traffic manager 207, which includes classifier 210 processors and dynamic multi-mode packet processor 212 for various switching modes, for classification and packet/data separation according to a switching mode. Classification and packet/data processing can be performed at the packet level or can be based on specific settings. For example, a particular line interface may specifically be associated with EPS, OBS, or OCS. Based on the results from classifier 210, the packets or traffic streams are processed according to one or more of the following switching modes: (1) EPS mode: Packets to be sent in the EPS mode are queued and transmitted on a packet by packet basis; (2) OBS mode: Packets or flows in the OBS mode are assembled into bursts according to the destination egress edge router address, and sent according to OBS mode protocols; and/or (3) OCS mode: Packets belonging to an optical circuit are sent on the lightpaths set up by the optical circuit switching protocols. In accordance with the switching mode, the packets or traffic streams are processed by EPS mode ingress packet processor 215, OBS mode ingress burst assembler 220, or OCS mode ingress circuit manager 225. In some embodiments, one or more of the EPS, OBS, or OCS modes may not be desired for traffic management. As such, the corresponding processor/assembler/manager may not receive any data from the classifier 210. In some embodiments, one or more mode specific processing units may not be configured. Switch 230 routes data to a desired location when outputting to DWDM transmitters 235. All wavelengths from the DWDM transmitters 235 are combined onto the outgoing DWDM link using a optical multiplexer (MUX) 240, such as a passive optical multiplexer. For example, packets for EPS, burst headers and burst for OBS, and optical signals for OCS are combined by MUX 240. In some embodiments, data from the edge router 130 are routed through RA-OBS core routers 120. In some embodiments, data from the edge router 130 are routed through traditional core router nodes via established lightpaths. In some embodiments, data from the edge router 130 are routed through RA-OBS core routers along with traditional core router nodes via established light paths.

In the egress direction, the wavelengths on the incoming DWDM link are separated using an optical demultiplexer (DEMUX) 245. DWDM receivers 250 convert optical signals back to the electronic domain. Switch 255 routes data to the corresponding traffic processors in egress traffic manager 257 based on the switching modes of the wavelengths for switching mode specific processing. For example, packets for the EPS mode are sent to EPS mode egress packet processor 260; converted data bursts and burst header packets for OBS mode are sent to OBS mode egress burst assembler 265; and converted optical data for OCS mode is sent to OCS mode egress circuit manager 270. Egress classifier 275 inspects the data from the traffic processors and forwards the data to appropriated line interfaces 205 for output to the desired network.

Figure 3A:
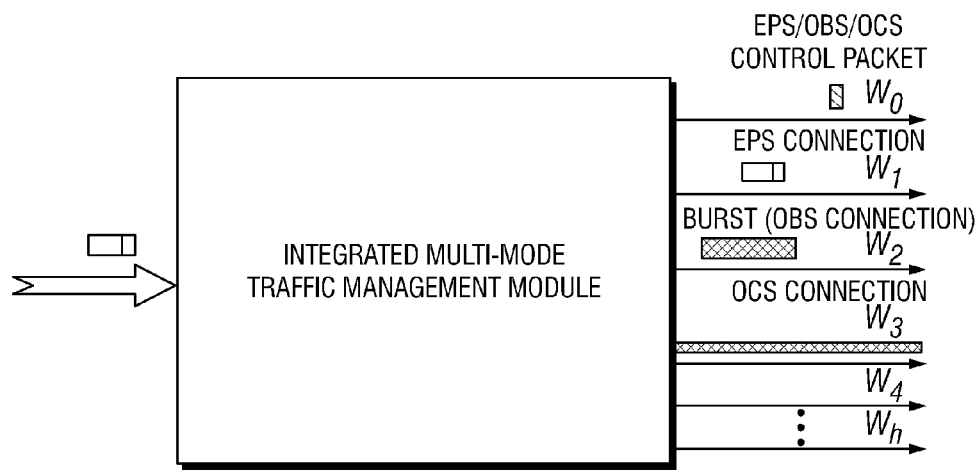
FIG. 3(a) is an illustrative implementation of an integrated multi-mode traffic management module that handles EPS, OBS and EPS connections.
Figure 3B:
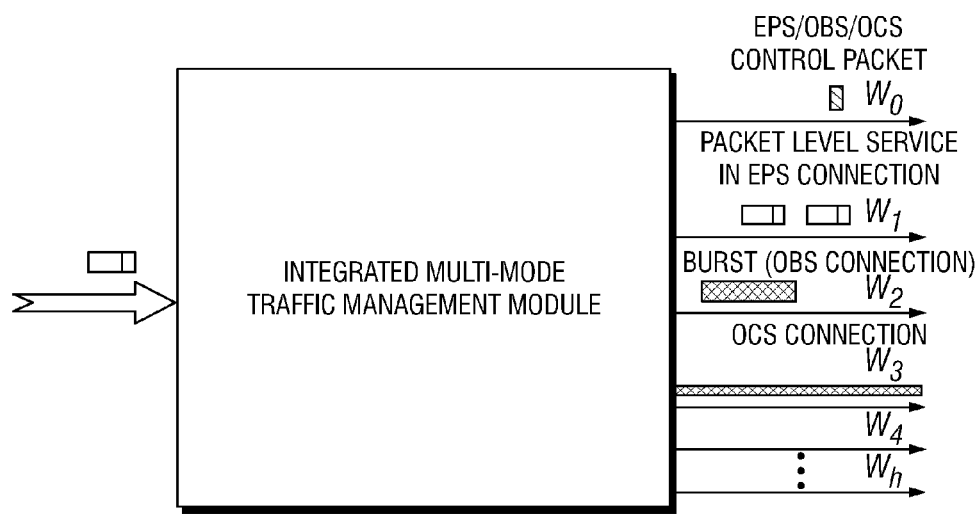
FIG. 3(b) is an illustrative implementation of an integrated multi-mode traffic management module that provides packet level services in EPS connections.
Figure 3C:
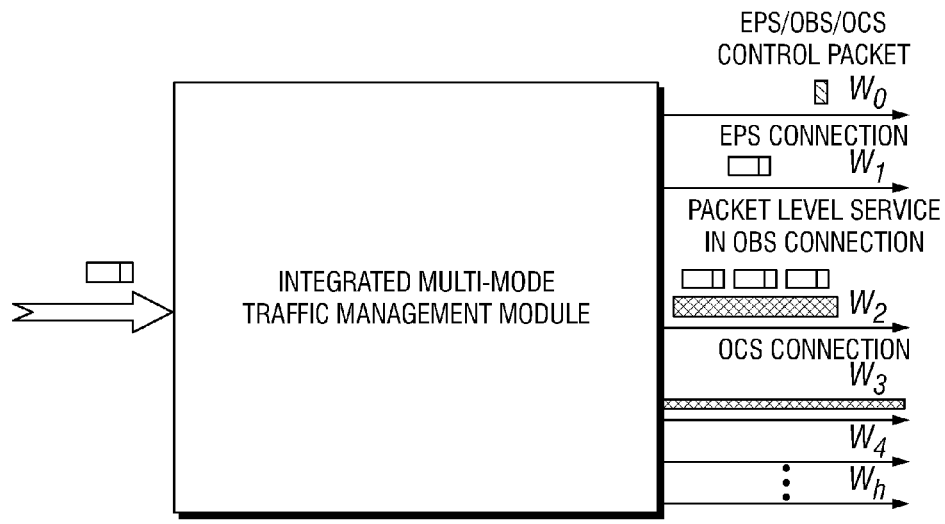
FIG. 3(c) is an illustrative implementation of an integrated multi-mode traffic management module that provides packet level services in OBS connections.
Figure 3D:
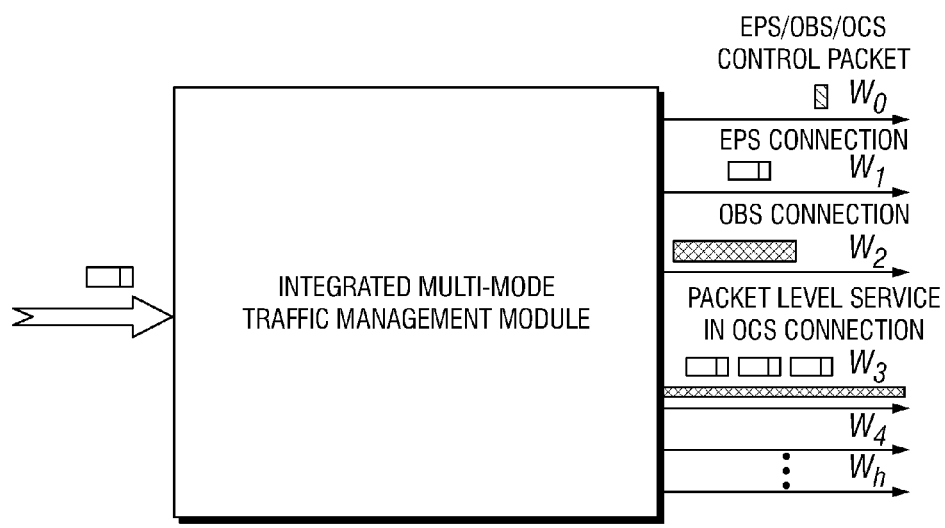
FIG. 3(d) is an illustrative implementation of an integrated multi-mode traffic management module that provides packet level services in OCS connections.
Figure 3E:
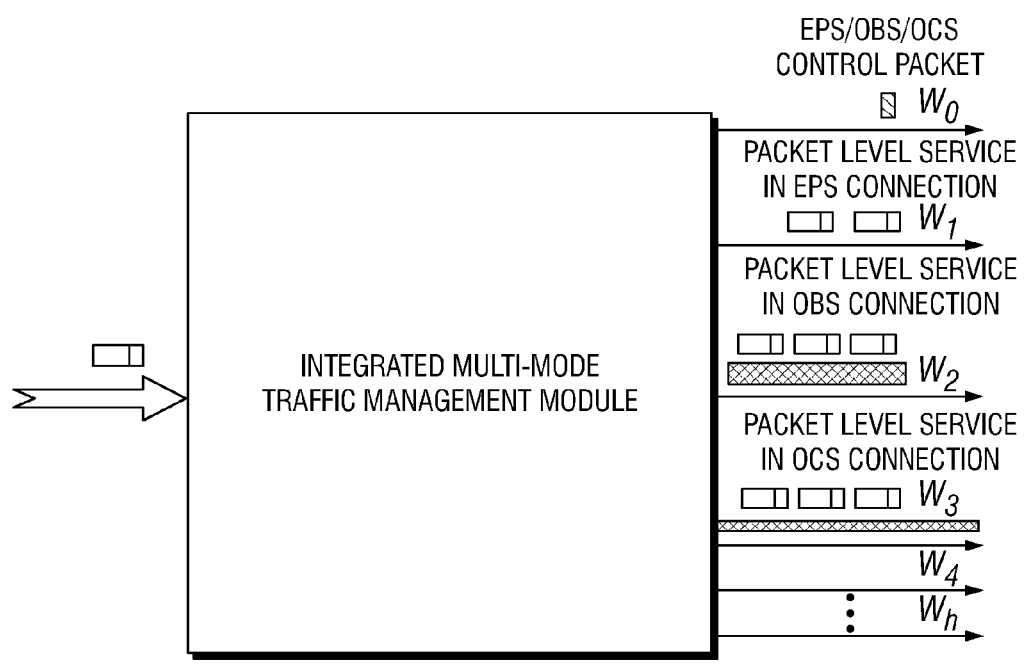
FIG. 3(e) is an illustrative implementation of an integrated multi-mode traffic management module that provides packet level services in EPS, OBS, OCS connections at the same time.

In one embodiment, an integrated multi-mode traffic management module provides traffic management to the EPS, OBS and OCS connections in DWDM wavelength channels, as well as the management of the EPS/OBS/OCS control packets as illustrated in FIG. 3(a). Data received by the multi-mode traffic management module may be processed for transmission via the EPS, OBS, and/or OCS connections. In various embodiments, the integrated multi-mode traffic management module may provide individual packet control to the EPS connections, OBS connections, or OCS connections as illustrated in FIGS. 3(b), 3(c), and 3(d), respectively. In FIG. 3(b), individually controlled packets are sent through EPS connections, which are terminated at the downstream router for router lookups. In some embodiments, the EPS connection may be treated as a special OBS connection with an infinite length duration. This allows more data to be transmitted optically and avoids the cost of expensive O/E/O conversion necessitated by other EPS systems. FIG. 3(c) illustrates a embodiment where packets can be individually controlled over OBS mode connections. This is in contrast with traditional optical burst switching. In traditional optical burst switching, packets are assembled into bursts, which are collections of a large number of packets, based on their destination edge router addresses. However, the major shortcoming of traditional OBS is that once a packet is appended to a burst, it becomes a part of the burst and the individual packet controllability is lost. Therefore, traditional OBS suffers from the coarse granularity that a burst provides. In the traffic management embodiments discussed herein, full controllability remains for packets going through OBS connections, as illustrated for example in FIG. 3 (c). In another embodiment, the system provides packet level services to OCS mode connections as shown in FIG. 3(d). In the traffic management systems discussed herein, OCS data may be treated (in similar manner as EPS connections as discussed above) as special cases of the OBS mode data. This allows for more data to be transmitted optically between the edge routers and allows OCS data to be handled at the packet level, thereby providing finer granularity than traditional OCS data transmission. In other embodiments, the integrated multi-mode traffic management module may provide controlled packet level services to the EPS, OBS, and OCS connections as illustrated in FIG. 3(e). By managing EPS, OCS, and OBS traffic as discussed, the traffic management systems and methods discussed herein may provide finer granularity than other traditional EPS, OBS, or OCS systems.

Figure 4:
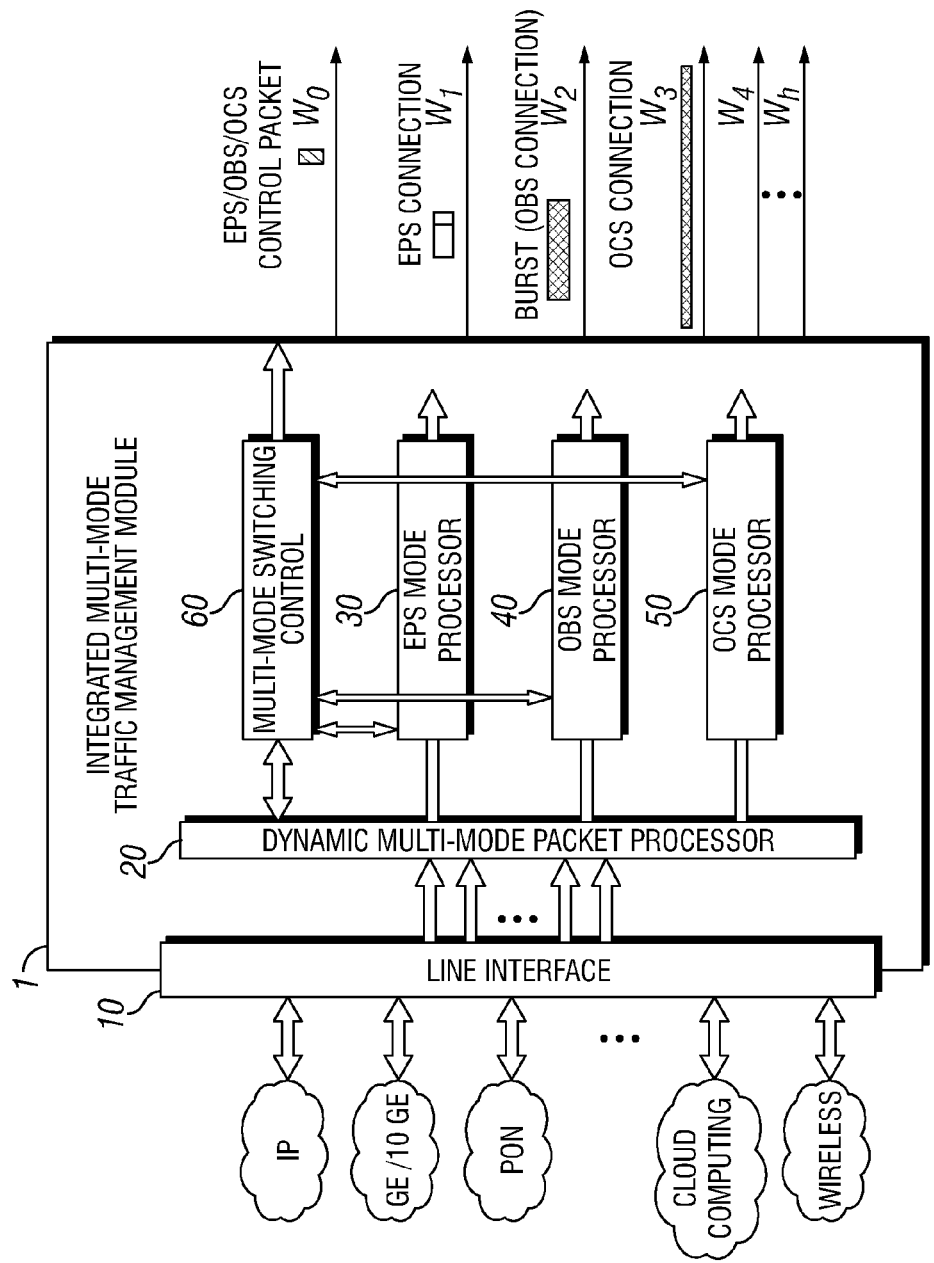
FIG. 4 is an illustrative implementation of an integrated multi-mode traffic management module.

An illustrative embodiment of an integrated multi-mode traffic management module 1 is provided in FIG. 4. Packets received by line interface 10 on different line interfaces such as IP, Gigabit Ethernet (GE)/10 GE, PON, cloud computing, wireless or the like are sent to the integrated multi-mode traffic management module 1. Dynamic multi-mode packet processor 20 in the integrated multi-mode traffic management module sends traffic to one of the following mode processing modules: EPS mode processor 30, OBS mode processor 40, or OCS mode processor 50. The dispatching of traffic can be performed based on packet classification, dynamic traffic conditions, specific settings such as a particular line interface, and/or the like. Based on the results from the dynamic multi-mode packet processor/scheduler 20, the packets or traffic streams are processed according to one of the following switching modes: (1) the EPS mode—Packets sent in the EPS mode are queued and transmitted in the EPS mode processor 430; (2) the OCS mode—Traffic streams in the OCS mode may be sent on established lightpaths via the OCS mode processor 50; (3) the OBS mode—Packets or flows in the OBS mode are assembled into bursts based on the destination edge router address/application requirements and sent according to the OBS mode protocols. The dynamic multi-mode packet processor 20 also interacts with the multi-mode switching control 60 which is responsible for dynamic multi-mode reconfiguration and signaling protocols for individual switching modes. Multi-mode switching control 60 may communication with core routers to initiate and/or negotiate request for the addition/removal of EPS, OBS, OCS mode connections, or a combination thereof. For example, multi-mode switching control 60 may generate EPS/OBS/OCS control packets for the corresponding EPS/OBS/OCS data provided on other wavelengths. All wavelengths are combined onto the outgoing DWDM link.

In one embodiment, packets are tagged to be sent in one of the three switching modes by the dynamic multi-mode packet processor 20 after classification. In another embodiment, packets are dispatched to one of the three switching modes according to dynamic traffic conditions. As a result, the switching mode for a particular packet is not fixed, and can be either the EPS, OCS or OBS mode based on dynamic traffic conditions. In another embodiment, the switching mode of a packet is not assigned until transmission time. In some embodiments, two levels of dynamic traffic management may be employed by the dynamic multi-mode packet processor 20, the underlining processors for the EPS mode, the OCS mode, and the OBS mode, or a combination thereof.

Figure 5:
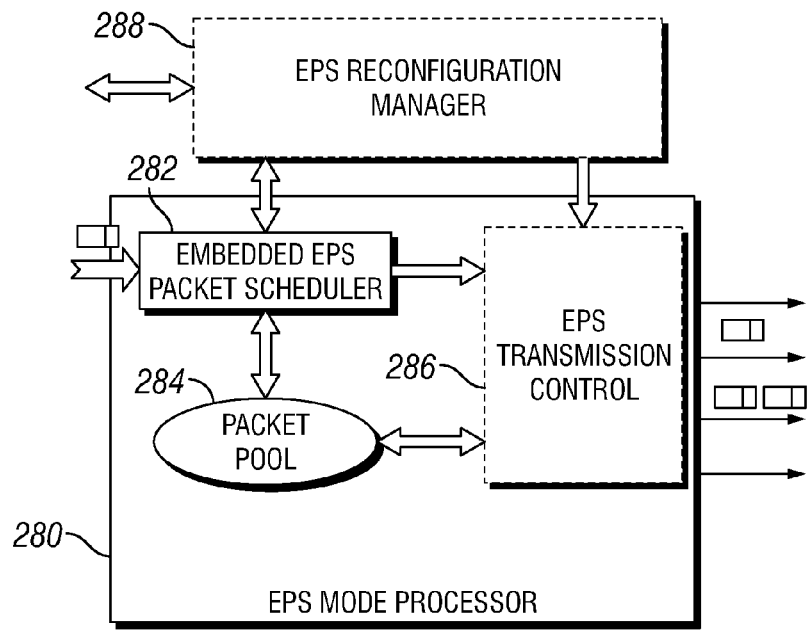
FIG. 5 is an illustrative implementation of an EPS mode processor.

An EPS mode processor 280 is illustrated in FIG. 5. In order to send packets over existing EPS connections, the embedded EPS packet scheduler 282 places packets received from the dynamic multi-mode packet processor into the packet pool 284 according to some criteria (e.g. QoS). Packets are selected by the embedded EPS packet scheduler 282 to transmit on one of the EPS mode connections via the EPS transmission controller 286. In one embodiment, EPS wavelength channel are setup or initiated by the EPS reconfiguration manager 288, and the EPS connections may be treated as a special case OBS connection with an infinite length duration until it is torn down. While similar to the treatment of OCS connections as special OBS connections, the difference is that the EPS channels are routed to electronic ports of some downstream router instead. Once an EPS channel is setup, packets flow to O/E/O converters for processing. In one embodiment, to add a new EPS mode connection or to remove an existing EPS connection, the dynamic multi-mode packet processor interacts with the multi-mode EPS reconfiguration manager 288 to initiate the reconfigurations of EPS connections. In another embodiment, the embedded EPS packet scheduler interacts with the multi-mode EPS reconfiguration manager to initiate reconfigurations of EPS connections. In one embodiment, the EPS connections are static. In another embodiment, the EPS connections are dynamic. Wavelength(s) configured for the EPS mode may be terminated in the downstream router. In some embodiments, the EPS channels are terminated at the immediate downstream router. In some embodiments, the EPS channels are terminated at non-adjacent downstream routers via light paths. The packets sent in the EPS mode are converted to electronic signals for further processing (e.g. router lookup or the like). The processed packet is then sent over another EPS mode wavelength leading towards the destination.

In one embodiment, the dynamic multi-mode packet processor dispatches packets to the EPS, OCS, or OCS mode on existing connections. In another embodiment, the dynamic multi-mode packet processor dispatches packets to the EPS, OCS or OCS mode which requires new connection setup, which may be set up by one of the mode processors or the multi-mode switching control.

Figure 6:
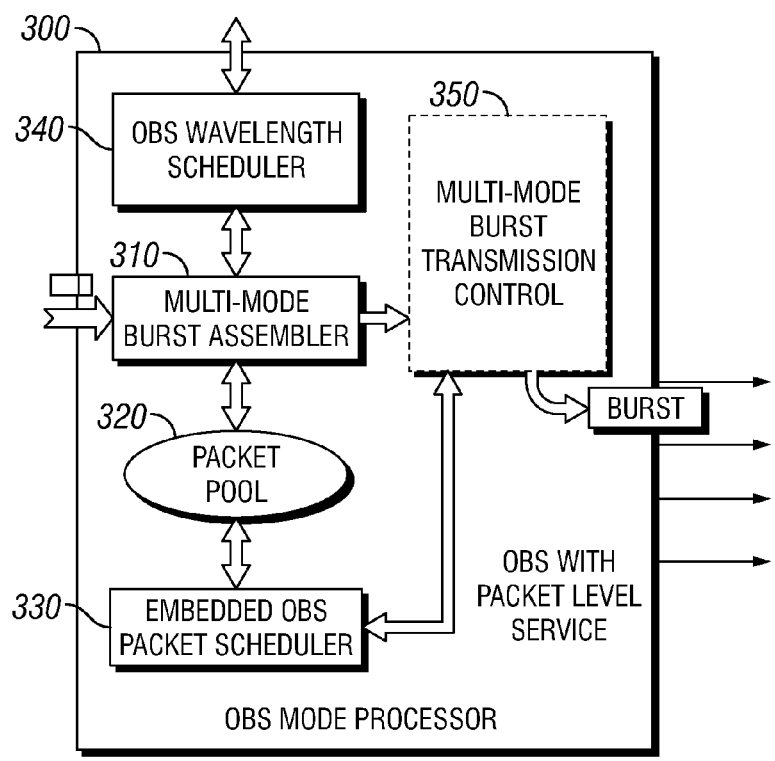
FIG. 6 is an illustrative implementation of an OBS mode processor.

FIG. 6 is an illustrative embodiment of an OBS mode processor 300, which enables packetized services in OBS, which provides individual control to packets, regardless of the granularity of the optical burst. According to the traffic management system, packets tagged to be sent in the OBS mode are not associated with particular bursts at the burst assembly time, as in traditional OBS. Instead, after the multi-mode burst assembler 310 accounts for the packet towards the burst, the packet is placed into packet queues in the packet pool 320, according to dynamic traffic requirements. The optical entity that the packet belongs to is determined dynamically based on certain criteria. In one embodiment, the association of the packets with the burst is decoupled from the wavelength resource reservation procedure. The packets may be maintained in a packet pool 320 after receiving the packets from the multi-mode burst assembler 310. The multi-mode burst assembler 310 may interact with the embedded OBS packet scheduler 330 for dynamic burst generation and wavelength scheduling. The collection of packets is managed by an embedded OBS packet scheduler 330 which is decoupled from the OBS wavelength scheduler 340. The OBS wavelength scheduler 340 determines the wavelength for the outgoing burst. The embedded OBS packet scheduler 330 interacts with the multi-mode burst transmission control 350 which controls the transmission of the bursts received from the multi-mode burst assembler 310.

In one embodiment, the multi-mode burst assembler 310 interacts with the dynamic multi-mode packet processor for burst generation and wavelength scheduling. In another embodiment, the multi-mode burst assembler 310 interacts with the embedded OBS packet scheduler 330 for burst generation and wavelength scheduling. In another embodiment, the multi-mode burst assembler 310 can create bursts based on applications requirements and send burst scheduling request to the OBS wavelength scheduler 340 without prior packet arrivals. In another embodiment, the multi-mode burst assembler 310 can create bursts based on burst reservation packets received from applications, customer edge, or the like, and send burst connection requests to the OBS wavelength scheduler 340. In another embodiment, the multi-mode burst assembler 310 can associate a subset of packets/queues in the packet pool 320 with a certain burst. In some embodiments, bursts are set up with certain durations. In some embodiments, bursts are set up with infinite length until they are specifically terminated. In some embodiments, bursts are transmitted after acknowledgements of connection setup are received. In some embodiments, burst connections are pre-established before data are received using advanced reservation.

In one embodiment, the multi-mode burst transmission control 350 interacts with the dynamic multi-mode packet scheduler to assign packets to bursts. In another embodiment, the multi-mode burst transmission module control 350 interacts with the embedded OBS packet scheduler 330 to assign packets to bursts. In one embodiment, such assignments are static. In another embodiment, such assignments are dynamic. In another embodiment, such assignments occur prior to the transmission of the bursts. In one embodiment, such assignments occur during the transmission of the bursts. In one embodiment, such assignment is to reduce the latency of real-time packets. In another embodiment, such assignment is to provide bandwidth and/or latency services to packets from different flows.

In one embodiment, the multi-mode burst assembler 310 receives arriving packet information from the dynamic multi-mode packet processor, and adds the packet length to its assembling burst of the same destination edge router. In another embodiment, the multi-mode burst assembler 310 receives arriving packet information from the embedded OBS packet scheduler 330, and the length of the packet is added to the assembling burst of the same destination edge router. In one embodiment, a burst is formed when the burst length, which multi-mode burst assembler 310 keeps track of, exceeds some predefined values. In another embodiment, a burst is formed when the burst length exceeds some dynamic threshold. In one embodiment, once a burst is formed, a burst scheduling request is generated and sent to the core routers.

In another embodiment, the dynamic multi-mode packet processor sends packet length and destination information to the multi-mode burst assembler 310 based on packets that have arrived at the edge router. In another embodiment, the dynamic multi-mode packet processor sends packet length and destination information to the multi-mode burst assembler 310 based on predicted packet traffic. In another embodiment, the expected traffic arrival time is sent along with the length (duration) and the destination information to the multi-mode burst assembler 310. In another embodiment, the multi-mode burst assembler 310 sets variable offset values between the burst scheduling request and the transmission of the burst. In another embodiment, dynamic virtual topologies can be configured for specific time durations, or for a certain set of applications.

Two levels of dynamic traffic management may be employed under the dynamic multi-mode packet processor, as well as the underlining traffic processors in the EPS mode, the OCS mode, and the OBS mode. In one embodiment, packets tagged to be sent in the OBS mode are queued according to dynamic traffic requirements. The optical entity that the packet belongs to is determined dynamically based on certain criteria. In one embodiment, such association is decoupled from the wavelength resource reservation procedure. One embodiment maintains the packets in a packet pool 320, and the collection of packets are managed by an embedded OBS packet scheduler 330 which is decoupled from the OBS wavelength scheduler 340. The embedded OBS packet scheduler 330 interacts with the transmission of the optical entities.

Figure 7:
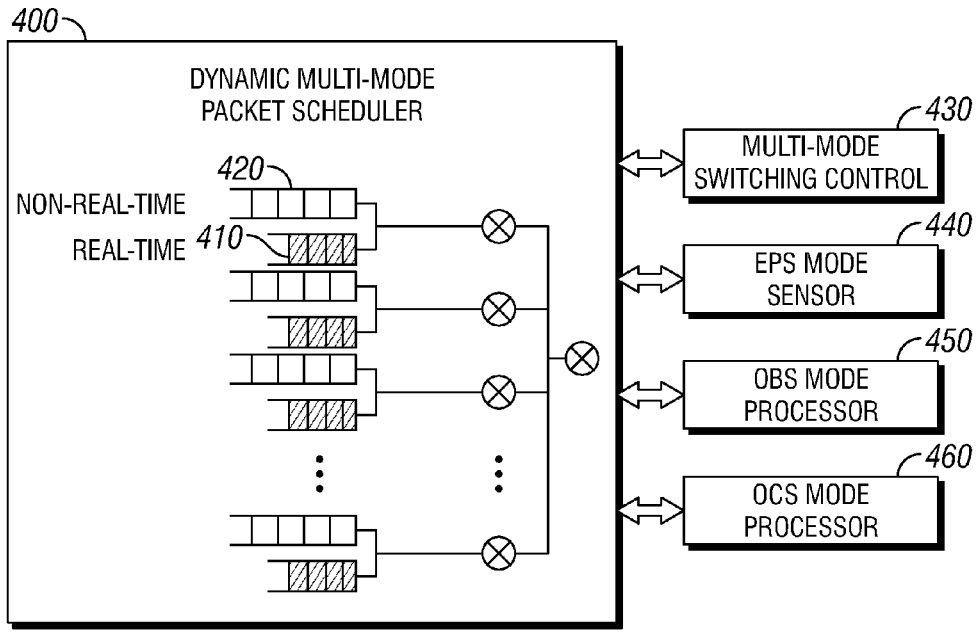
FIG. 7 is an illustrative implementation of supporting real-time and non-real-time traffic in a dynamic multi-mode packet scheduler.

With the traffic management systems and methods discussed herein, real-time traffic, priority traffic, per flow/application queuing, or the like can be supported in the multi-mode switching DWDM networks using wavelengths configured in any of the following modes: the EPS mode, the OCS mode, and/or the OBS mode. FIG. 7 is an illustrative embodiment of a dynamic multi-mode packet scheduler 400 supporting real-time and non-real-time traffic. One embodiment of the dynamic multi-mode packet scheduler 400 implements desirable packet level traffic management schemes and controls the transmission of the optical entity. For example, to support real-time traffic, traffic arriving at the dynamic multi-mode packet scheduler 400 is directed to one of the two queues: a real-time traffic queue 410 and a non-real-time traffic queue 420. Packets from each queue can be directed to multi-mode switching control 430, EPS mode processor 440, OBS mode processor 450, or OCS mode processor 460 to achieve the latency objectives.

One embodiment of the dynamic multi-mode packet processor implements desirable packet level traffic management schemes and controls the transmission of the optical entity. For example, to support real-time traffic, traffic is directed to one of the two queues: one for real-time traffic and one for other traffic. Packets from each queue can be directed to one of the three switching modes to achieve the latency objectives. In another embodiment, dynamic multi-mode packet processor supports per flow queuing to provide both bandwidth and latency guarantees. Different packet management schemes can be deployed in the dynamic multi-mode packet processor at edge routers allowing the majority of the dynamic traffic to pass through core routers optically, minimizing the number of electronic switching ports needed at core router nodes and thus reducing cost.

Figure 8A:
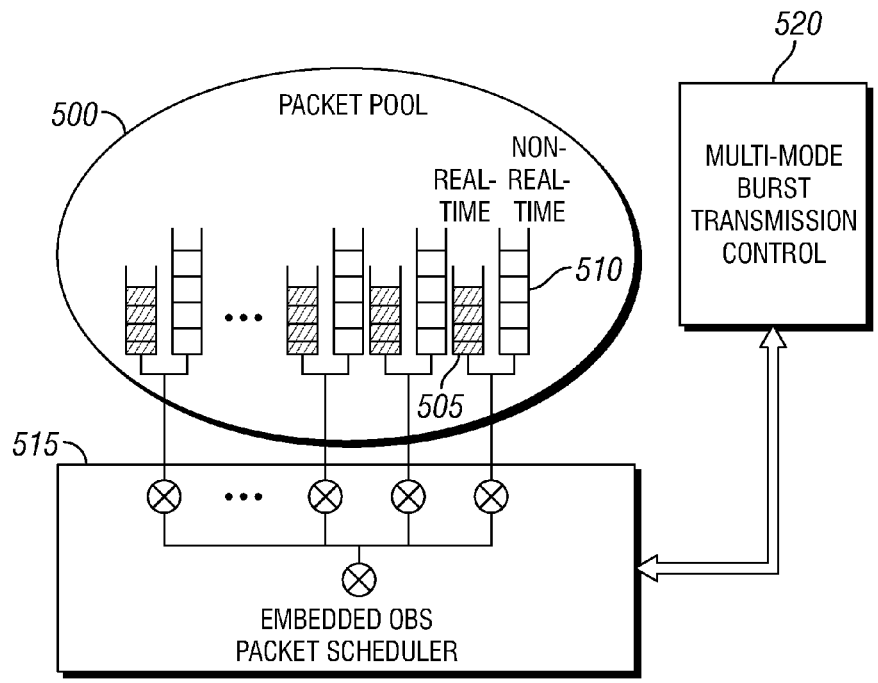
FIG. 8(a) is an illustrative implementation of supporting real-time and non-real-time traffic in a OBS mode processor.
Figure 8B:
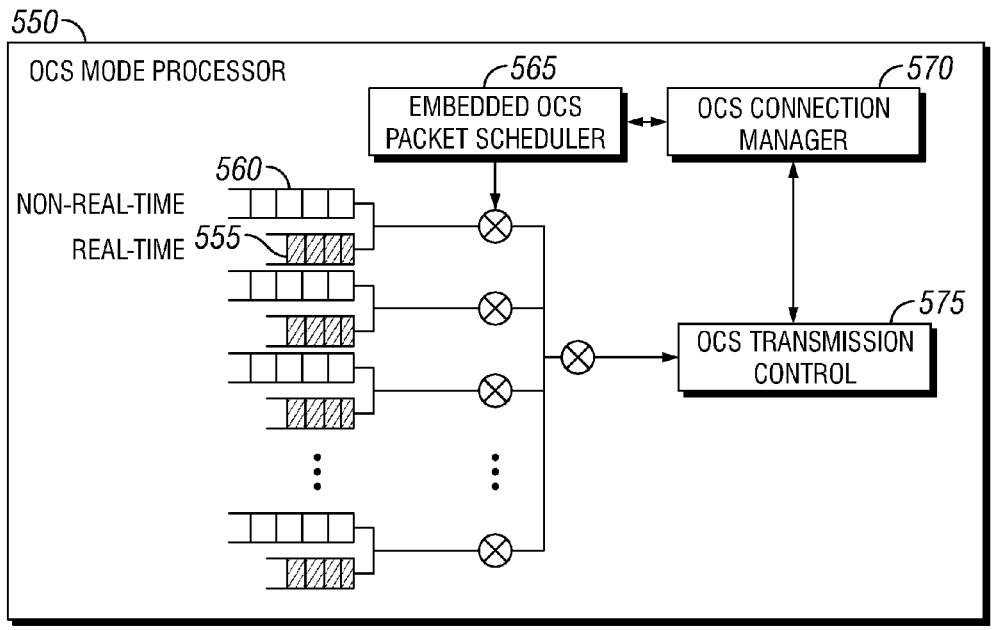
FIG. 8(b) is an illustrative implementation of supporting real-time and non-real-time traffic in the OCS mode processor.

FIG. 8(*a*) is an illustrative embodiment of a packet pool 500 in an OBS mode processor. Packet pool 500 implements real-time queue(s) 505 and non-real-time queue(s) 510. The embedded OBS packet schedule 515 makes decisions on the packet to be forwarded to multi-mode burst transmission control 520. FIG. 8(*b*) is an illustrative embodiment of a OCS mode processor 550. Real-time queue(s) 555 and non-real-time queue(s) 560 are provided by the OCS mode processor 550. The embedded OCS packet scheduler 565 makes decisions on the dispatching of real-time and non-real-time packets, providing packet level traffic management in OCS connections. OCS connection manager 570 communicates with embedded OCS packet scheduler 565 to provide packets to OCS transmission control 575 when desired. OCS transmission control 575 outputs the OCS data to a desire wavelength.

In one embodiment, the dynamic multi-mode packet processor interacts with the OCS connection manager 570 to initiate the setup/tear down of OCS connections. In another embodiment, the embedded OCS packet scheduler 565 interacts with the OCS connection manager 570 to initiate the setup/tear down of OCS connections. In one embodiment, OCS connection manager 570 initiates OCS connections by treating OCS connections as a special case of OBS connection with an infinite length duration until it is torn down. Optical paths set by the OCS mode are relatively long lasting connections that assume infinite lengths until explicit disconnection occurs. In one embodiment, the OCS connections are static. In another embodiment, the OCS connections are dynamic.

Figure 9:
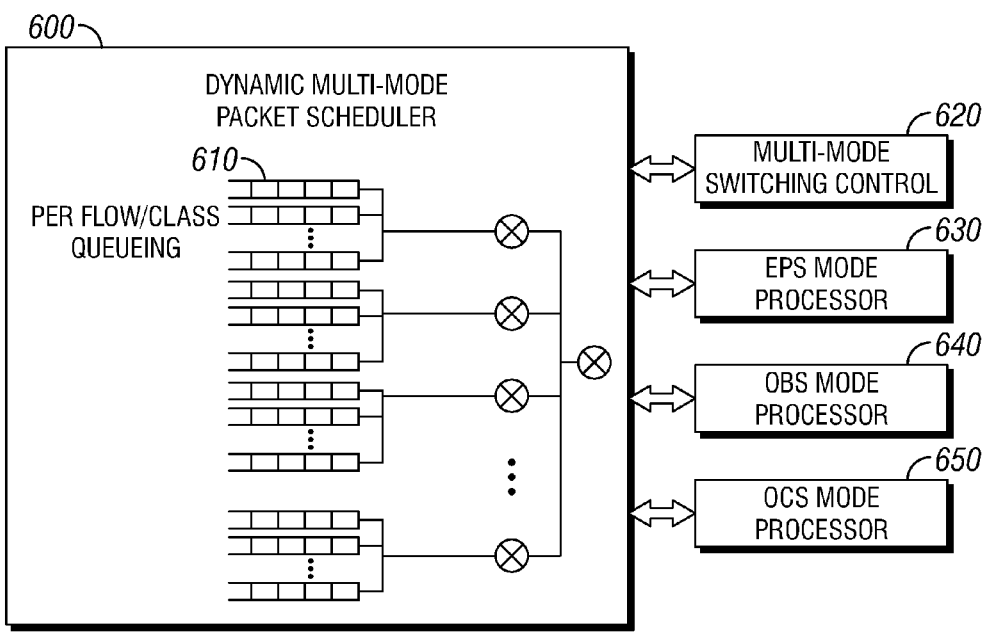
FIG. 9 is an illustrative implementation of supporting per flow/class traffic in a dynamic multi-mode packet scheduler.

Another embodiment of the invention supports multi-mode per flow queuing to provide bandwidth and/or latency guarantees. FIG. 9 is an illustrative embodiment of a dynamic multi-mode packet scheduler 600 supporting per flow/class traffic. Different packet management schemes can be deployed in the dynamic multi-mode packet scheduler 600, which can dispatch packets in the OBS, OCS, and/or EPS mode. Queues 610 are utilized to support per flow/class traffic, and queues 610 provide the packets to multi-mode switching control 620, EPS mode processor 630, OBS mode processor 640, and/or OCS mode processor 650. With per flow queuing, the next hop to be used is selected for each unique combination of source and destination IP addresses. Therefore, multiple connections between the same pair of hosts would require only one selection.

Figure 10A:
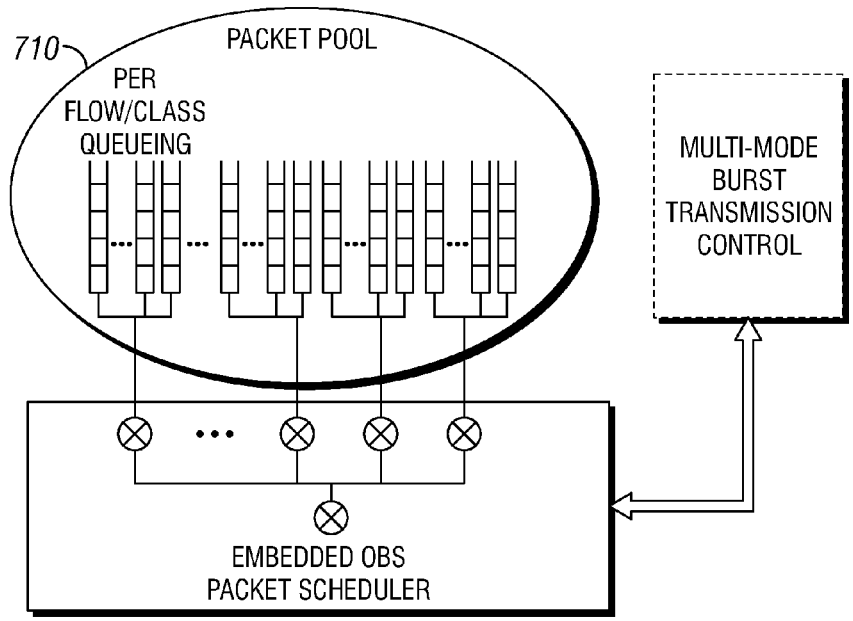
FIG. 10(a) is an illustrative implementation of supporting per flow/class traffic in an OBS mode processor.
Figure 10B:
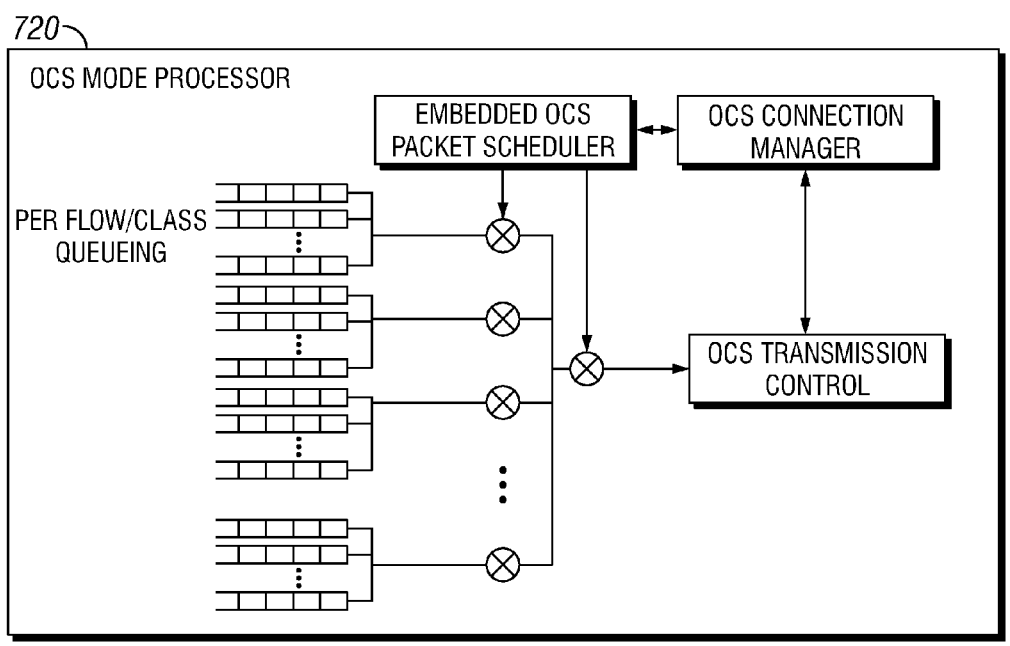
FIG. 10(b) is an illustrative implementation of supporting per flow/class traffic in an OCS mode processor.

In other embodiments, different packet management schemes can be deployed in an OBS mode processor and/or OCS mode processor. For example, per flow/class queues may be provided in a packet pool 710 in an OBS mode processor shown in FIG. 10(*a*), in a OCS mode processor 720 shown in FIG. 10(*b*), or a combination thereof. These multi-mode traffic management techniques allows the majority of the dynamic traffic to pass through core routers optically, minimizing the number of electronic switching ports needed at core router nodes and thus reducing cost.

Figure 11:
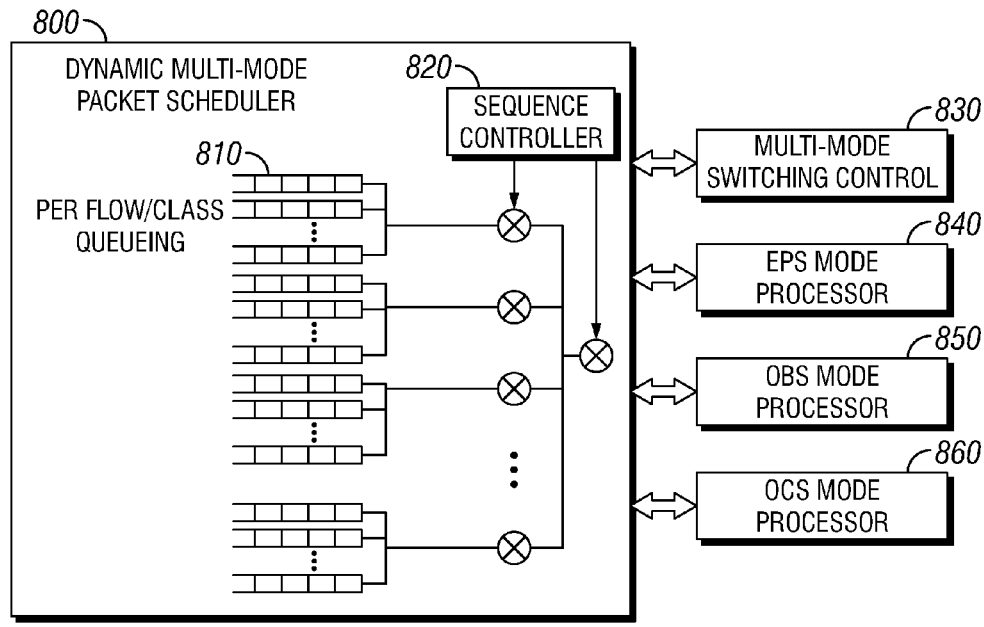
FIG. 11 is an illustrative implementation of sequence control in a dynamic multi-mode packet scheduler.

FIG. 11 illustrates a dynamic multi-mode packet scheduler 800 utilizing a sequence controller 820. The dynamic multi-mode packet scheduler 800 provides a sequence controller 820 coupled to per flow/class queues 810. Sequence controller 820 ensures that packets going to the same destination router are delivered in sequence. Packets output from multi-mode packet scheduler 800 are then outputted to multi-mode switching control 830, EPS mode processor 840, OBS mode processor 850, or OCS mode processor 860. In another embodiment, the multi-mode packet scheduler classifies packets to be sent to one of the three switching modes, and a sequence controller for a particular switching mode ensures in-sequence delivery of packets. In some embodiment, the sequence controller ensures packets delivered in the mode arrive at the destination edge router in sequence based on some metrics. In one embodiment, the sequence controller ensures packets going through a particular route arrive at the destination edge router in sequence. In another embodiment, the sequence controller ensures packets going through different routes arrive at the destination edge router in sequence. In another embodiment, the sequence controller ensures packets from a particular line interface arrive at the destination edge router in sequence. In another embodiment, the sequence controller ensures packets from certain applications arrive at the destination edge router in sequence.

Figure 12:
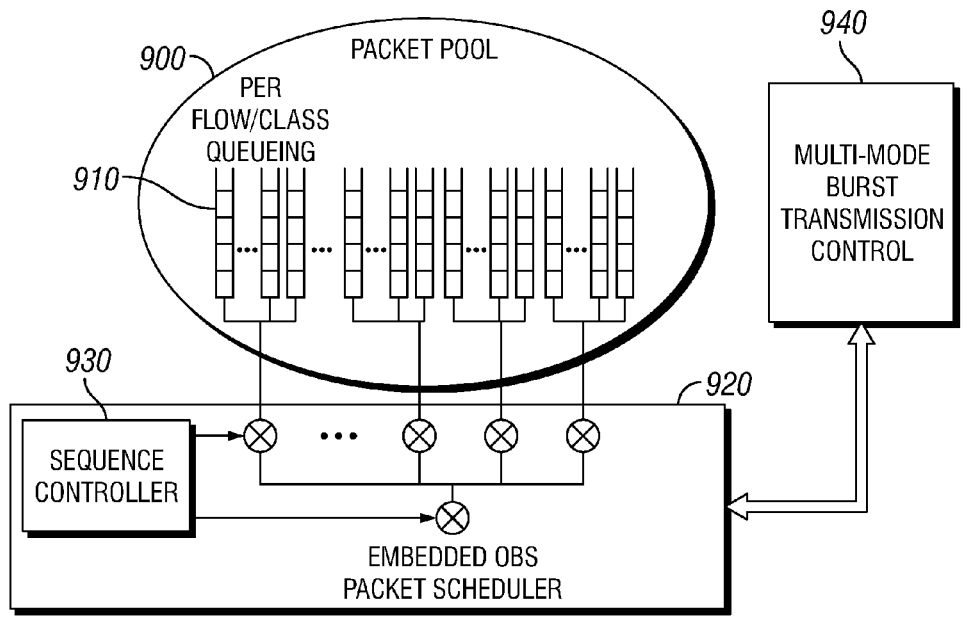
FIG. 12 is an illustrative implementation of sequence control in an OBS mode processor.

FIG. 12 illustrates an embedded OBS packet scheduler 920 of an OBS mode processor utilizing a sequence controller 930. Packet pool 900 provides per flow/class queues 910 that provided packets to embedded OBS packet scheduler 920. The embedded OBS packet scheduler 920 coupled to multi-mode burst transmission control 940 dispatches packets according to sequence controller 930 to ensure that packets going to the same destination router are delivered in sequence. In another embodiment, the multi-mode packet scheduler classifies packets to be sent to one of the three switching modes, and a sequence controller for a particular switching mode ensures in-sequence delivery of packets. In an embodiment, the sequence controller ensures packets delivered in the mode arrive at the destination edge router in sequence based on some metrics. In one embodiment, the sequence controller ensures packets going through a particular route arrive at the destination edge router in sequence. In another embodiment, the sequence controller ensures packets going through different routes arrive at the destination edge router in sequence. In another embodiment, the sequence controller ensures packets from a particular line interface arrive at the destination edge router in sequence. In another embodiment, the sequence controller ensures packets from certain applications arrive at the destination edge router in sequence.

Figure 13:
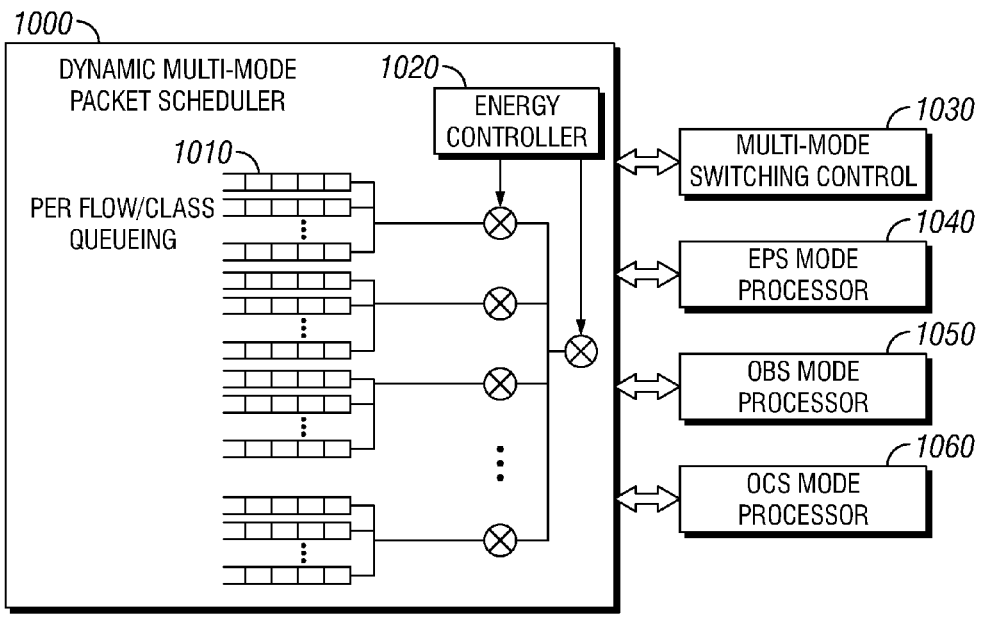
FIG. 13 is an illustrative implementation of energy efficiency control in a dynamic multi-mode packet scheduler.
Figure 14:
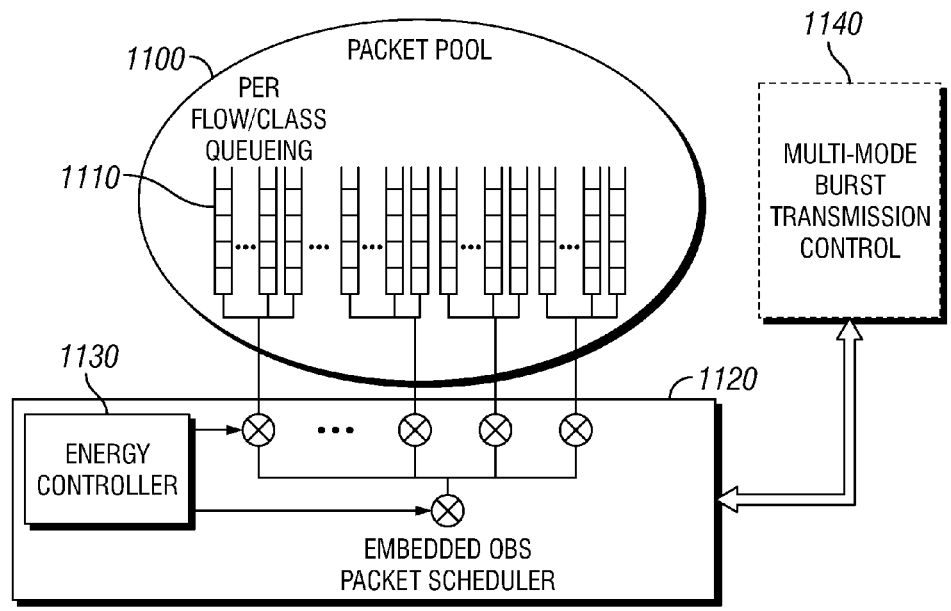
FIG. 14 is an illustrative implementation of energy efficiency control in an OBS mode processor.

FIG. 13 is an illustrative embodiment of a dynamic multi-mode packet scheduler 1000 utilizing an energy controller. The energy controller 1020 in the dynamic multi-mode packet scheduler 1000 dispatches packet from per flow/class queues 1010 according to energy related metrics to reduce energy consumption. For example, optical/electrical/optical conversion or route lookup/packet processing incurred on the path may be undesirable for reduced energy consumption. Energy related metrics may reduce optical/electrical/optical conversion, route lookup/packet processing incurred on the path, manage traffic utilizing a suitable energy related metric, or a combination thereof. The packet can be provided to multi-mode switching control 1030, EPS mode processor 1040, OBS mode processor 1050, or OCS mode processor 1060. FIG. 14 is an illustrative embodiment of an OBS mode processor utilizing an energy controller 1130. Packet pool 1100 utilizes per flow/class queues 1110 to provide packets to embedded OBS packet scheduler 1120. Energy controller 1130 in the embedded OBS mode packet scheduler 1120 dispatches packets to multi-mode burst transmission control 1140 according to energy related metrics to reduce energy consumption.

Figure 15A:
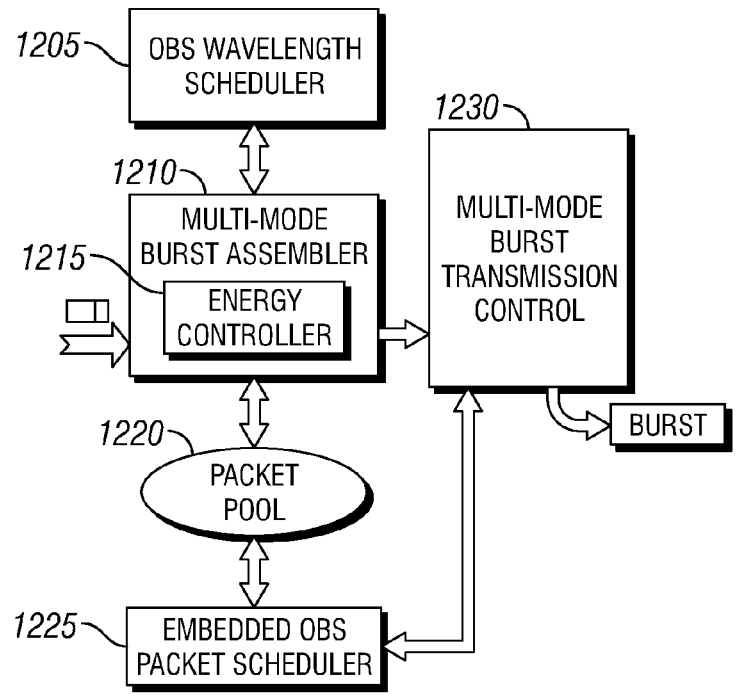
FIG. 15(a) is an illustrative implementation of energy efficiency control in a multi-mode burst assembler.

In other embodiments, energy efficiency is achieved at the burst level. FIG. 15(a) is an illustrative embodiment of an OBS mode processor utilizing a energy controller 1215 in a multi-mode burst assembler. As discussed previously, OBS mode processor may provide an OBS wavelength scheduler 1205, multi-mode burst assembler 1210, packet pool 1220, embedded OBS packet scheduler 1225, and multi-mode burst transmission control 1230. The energy controller 1215 in the multi-mode burst assembler 1210 assembles bursts according to energy related metrics to reduce energy consumption. For example, energy related metrics may reduce optical/electrical/optical conversion and/or route lookup/packet processing incurred on the path.

Figure 15B:
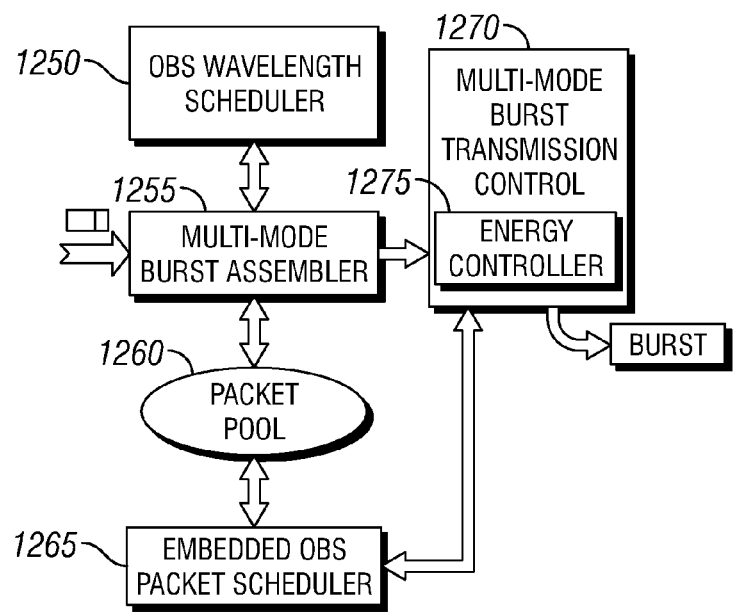
FIG. 15(b) is an illustrative implementation of energy efficiency control in a multi-mode burst transmission control.

FIG. 15(b) is an illustrative embodiment of an OBS mode processor utilizing a energy controller 1275 in multi-mode burst transmission control 1270. As discussed previously, OBS mode processor may provide an OBS wavelength scheduler 1250, multi-mode burst assembler 1255, packet pool 1260, embedded OBS packet scheduler 1265, and multi-mode burst transmission control 1270. Energy efficiency is achieved at the wavelength scheduling level. The energy controller 1275 in the multi-mode burst transmission control 1270 is in charge of the burst transmission in order to reduce energy consumption.

Figure 16:
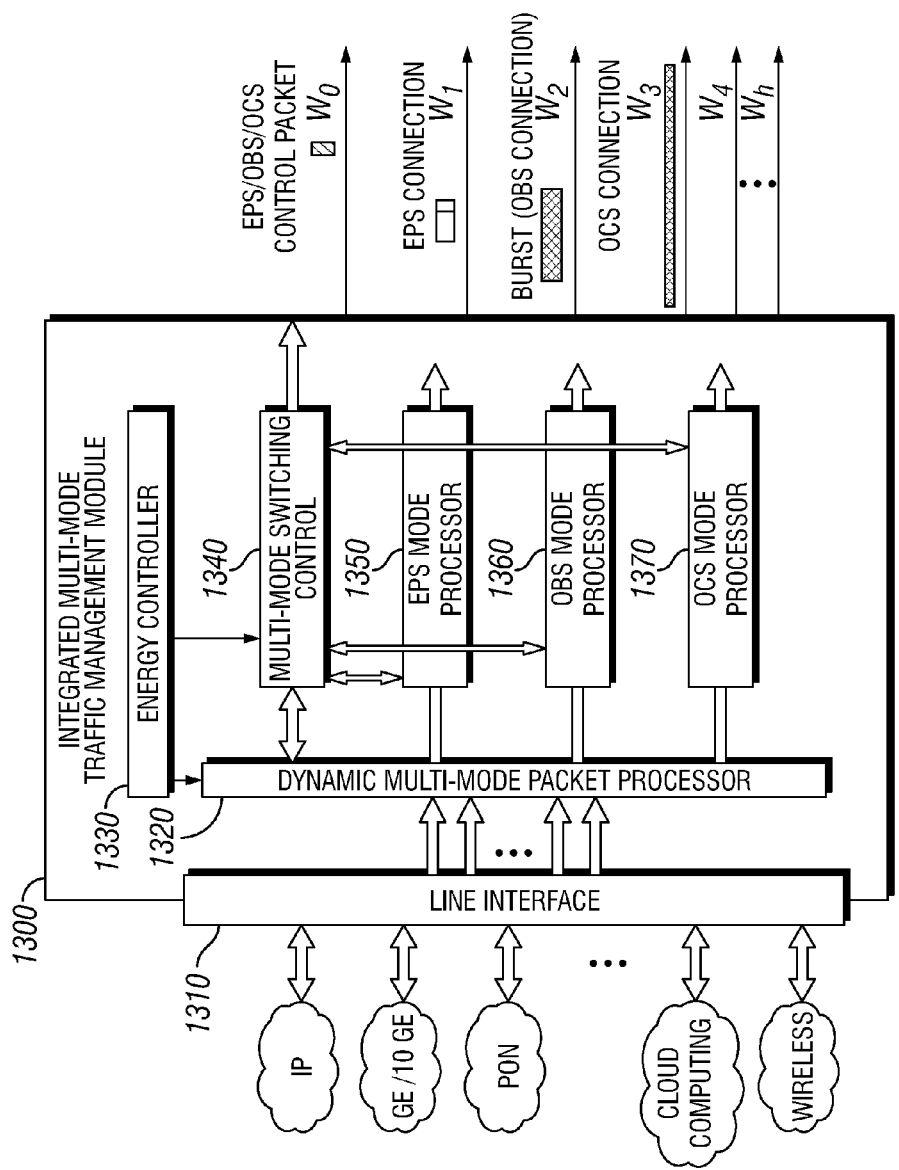
FIG. 16 is an illustrative implementation of energy efficiency control in a dynamic multi-mode packet scheduler.

FIG. 16 is an illustrative implementation of an integrated multi-mode traffic management module 1300 utilizing an energy controller 1330. As discussed previously, integrated multi-mode traffic management module 1300 may include a line interface 1310, multi-mode switching control 1340, EPS mode processor 1350, OBS mode processor 1360, or OCS mode processor 1370. The energy controller 1330 interacts with multiple modules in the integrated multi-mode traffic management module 1300 to reduce energy consumption. For example, energy related metrics may reduce optical/electrical/optical conversion and/or route lookup/packet processing incurred on the path.

Figure 17:
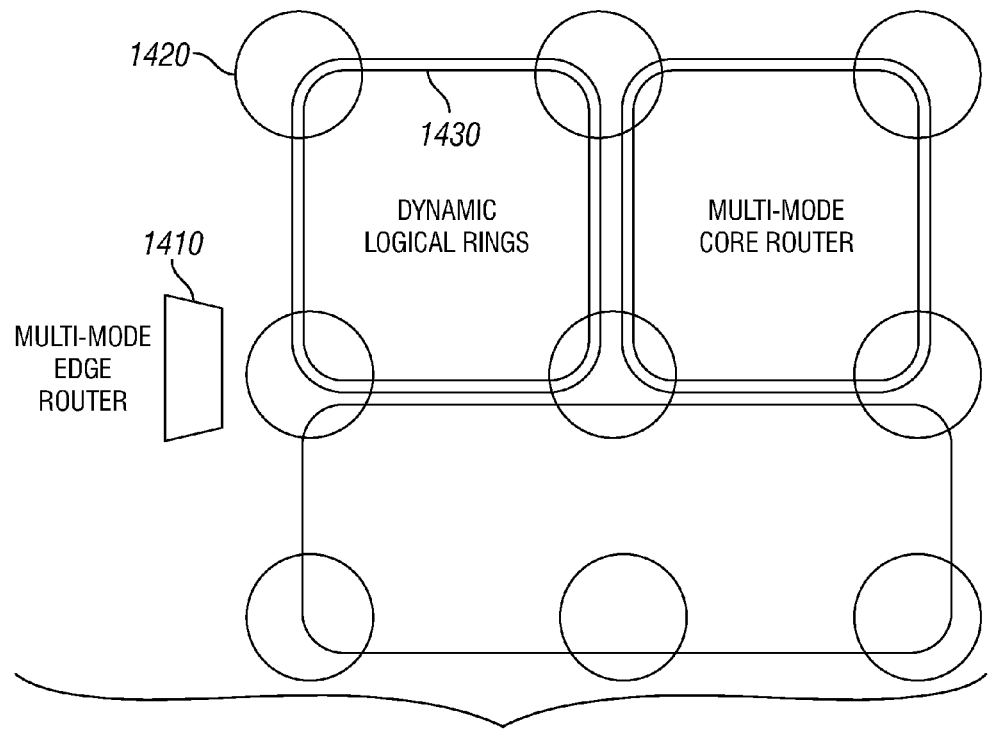
FIG. 17 is an illustrative implementation of dynamic logical ring built with integrated dynamic traffic management enabled multi-mode switching edge routers and core routers.

In one embodiment illustrated in FIG. 17, the multi-mode edge router 1410 with an integrated multi-mode traffic management module sets up dynamic logical connections or rings 1430 at the multi-mode core routers 1420 based on traffic requirements. Multi-degree scheduling at the core router ensures that there are no wavelength conflicts on the shared paths. The dynamic logical rings 1430 indicate a pathway for packet(s) through multi-mode core routers 1420, which may be dynamically modified according to traffic conditions.

Figure 18:
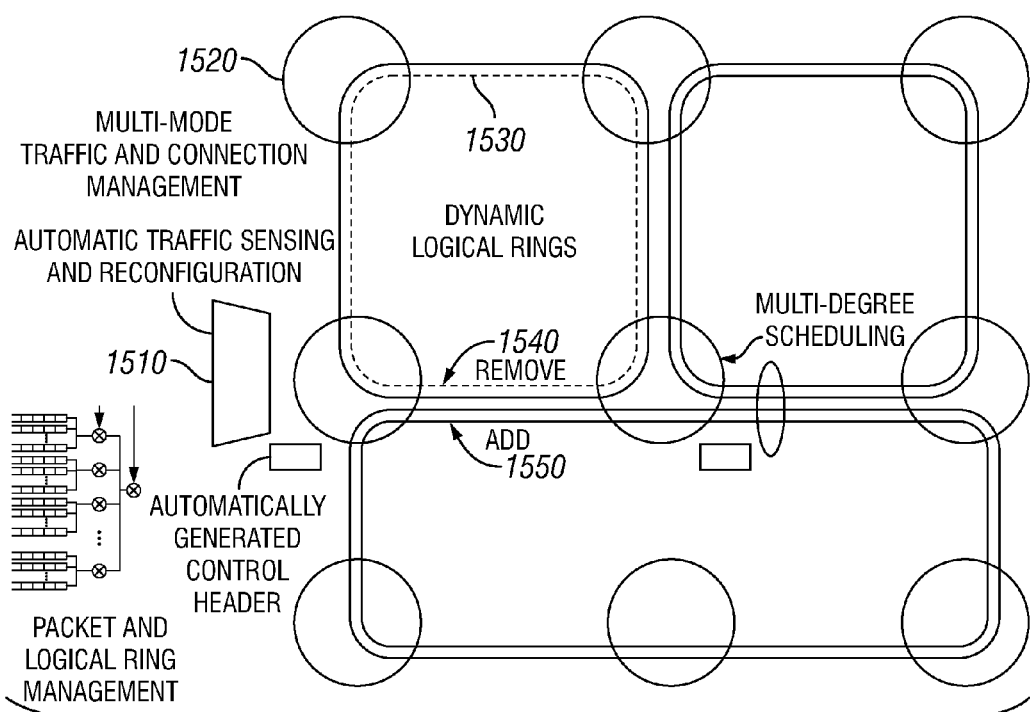
FIG. 18 is an illustrative implementation of dynamic reconfiguration of logical rings.
Figure 19:
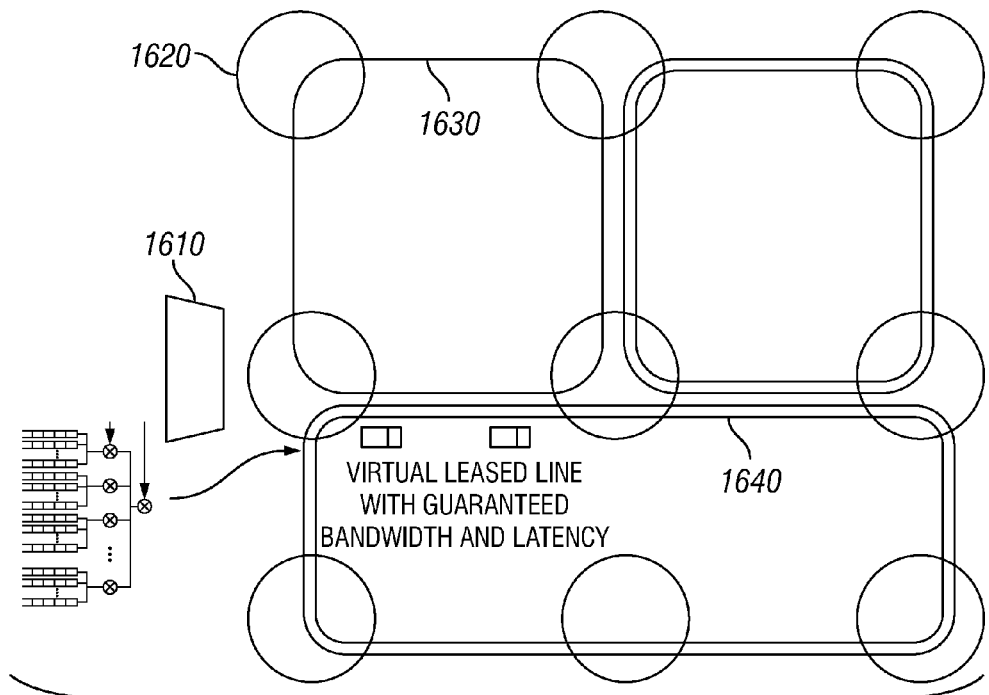
FIG. 19 is an illustrative implementation of virtual leased lines with guaranteed bandwidth and latency.

In another embodiment illustrated in FIG. 18, the integrated multi-mode traffic management module of edge router 1510 performs automatic traffic sensing and dynamic connection reconfiguration through core routers 1520. As the traffic demand for some logical rings 1530 reduces, logical rings can be dynamically removed 1540. New logical rings are dynamically added 1550 to satisfy new demands on other paths. The virtual connections/rings 1640 can be setup as virtual leased lines with guaranteed bandwidth and latency, as shown in FIG. 19. Edge router 1610 routes data through edge routers 1620 via logical rings 1630. Additionally, virtual leased lines 1640 can be dynamically created for a certain event, a large data transfer, a session, or the like. The virtual leased lines can be created with dedicated lightpaths, or with shared lightpaths using the integrated packet scheduling module to provide guaranteed bandwidth and latency.

Figure 20:
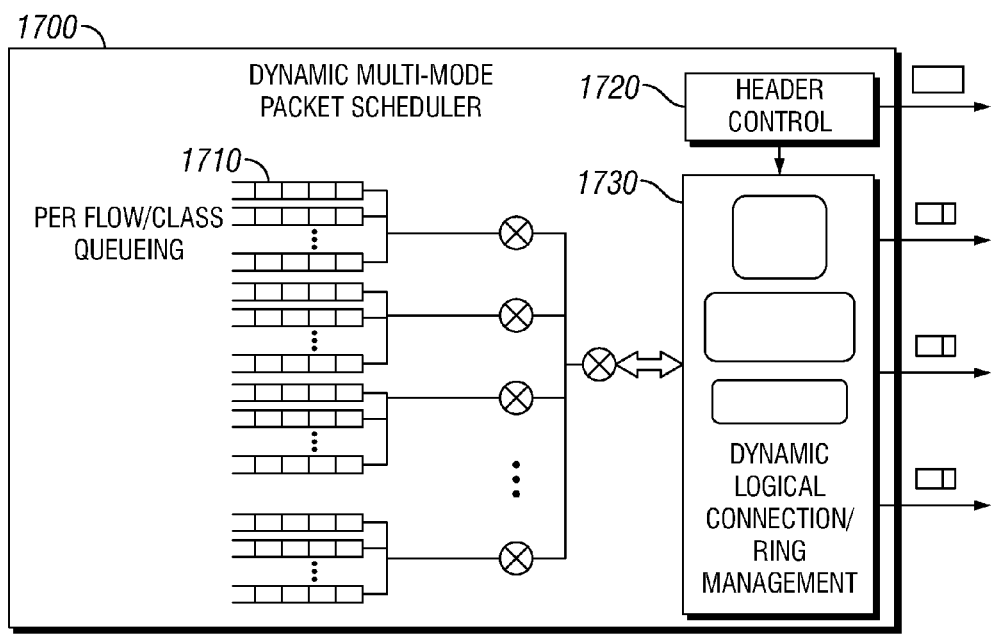
FIG. 20 is an illustrative implementation of a dynamic multi-mode packet scheduler with the dynamic logical connection/ring management module.

In an embodiment illustrated in FIG. 20, the dynamic logical connection/ring management module 1730 interacts with the dynamic multi-mode packet scheduler 1700 to send selected packets 1710 over the connections/rings. The dynamic logical connection/ring management module also interacts with the header control 1720 to send reconfiguration control header to the core routers.

Figure 21:
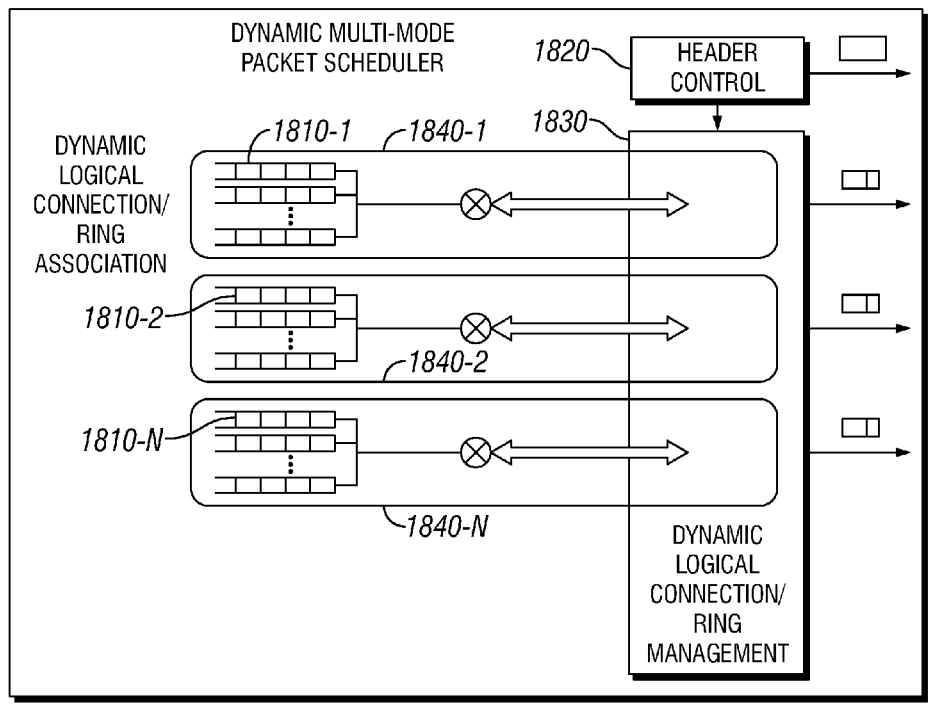
FIG. 21 is an illustrative implementation of a dynamic virtual logical ring/connection association.

In another embodiment illustrated in FIG. 21, dynamic logical connection/ring management module 1830 interacts with the dynamic multi-mode packet scheduler 1800 and header control 1820. The dynamic logical connection/ring management module 1830 can dynamically associate a subset of packet queues 1810-1, 1810-2, 1810-$n$ with certain logical connections/rings 1840-1, 1840-2, 1840-$n$. In another embodiment, a new logical connection/ring can be created when a new session or a set of new sessions start, in which case, a reconfiguration control header will be automatically created.

Figure 22:
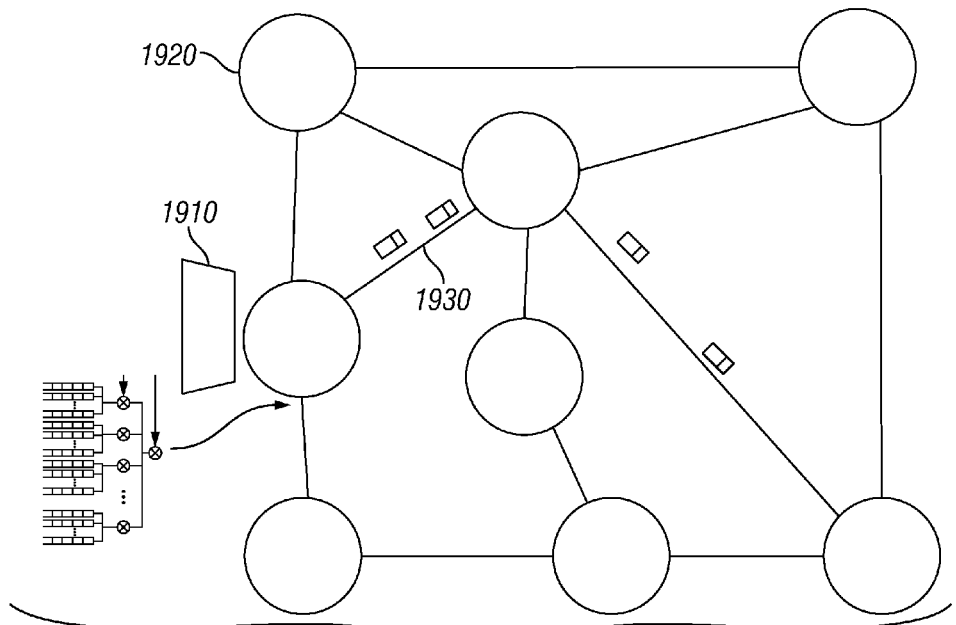
FIG. 22 is an illustrative implementation of dynamic connections over a mesh topology.

In another embodiment, virtual connections 1930 can be created over a mesh topology, as illustrated in FIG. 22. Edge router 1910 may route data through a mesh network of core routers 1920 through virtual connections 1930. For example, edge router 1910 may set up dynamic mesh pathway(s) through one or more core routers for selected packets. Packet level services are provided by the integrated traffic management module over the virtual connections. In another embodiment, edge router 1910 and core router 1920 are partitioned into multiple virtual routers using the EPS, OBS and/or OCS connections.

Figure 23:
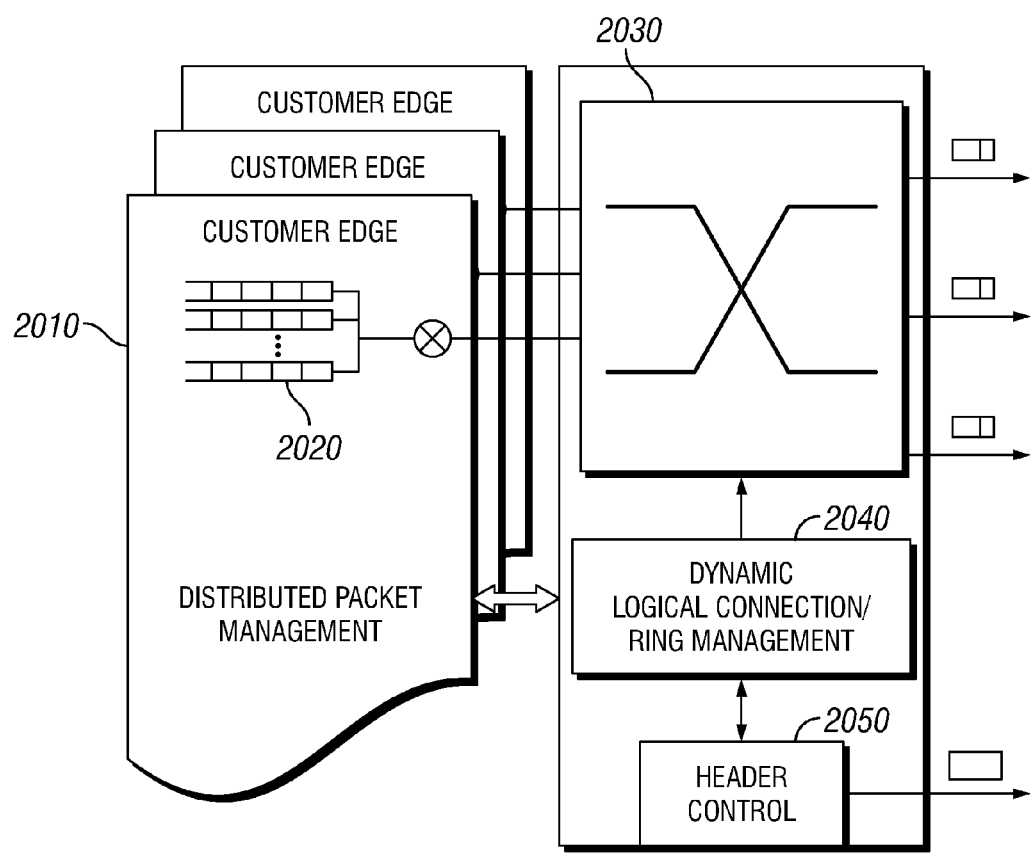
FIG. 23 is an illustrative implementation of distributed packet management with dynamic logical connection/ring management module.

In another embodiment, the queuing of packets 2020 are distributed over customer edges 2010, as illustrated in FIG. 23. The dynamic logical connection/ring management module 2040 interacts with distributed customer edges 2010 and dispatches packets over logical connections/rings. Header control 2050 communicates with dynamic logical connection/ring management module 2040 and generates control packets when necessary. In one embodiment, customer edge 2010 is coupled to a switch 2030 that routes packets as desired. In one embodiment, an electronic packet switching fabric is used to router packets to the destined optical interfaces. In another embodiment, the logical connections/ rings are created using multi-lane optical switching architecture.

While the Dense Wavelength Division Multiplexing (DWDM) multi-mode switching systems and methods discussed herein specifically focuses on router architecture, one of ordinary skills in the art, will recognize the applicability of this approach to other types of designs and applications that can significantly impact how IP and optical networks can be efficiently implemented which would affect the evolution of future networks.

While the traffic management systems and methods described herein specifically focuses on the use of efficient dynamic packet traffic management to Dense Wavelength Division Multiplexing networks, one of ordinary skills in the art, with the benefit of this disclosure, would recognize the extension of the approach to other networks and systems.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. An edge router system providing optical burst switching (OBS), the system comprising:

an OBS processor module receiving data or burst reservation packets from one or more sources, wherein said OBS processor module comprises
a burst assembler receiving said data or said burst reservation packets, wherein said burst assembler forms outgoing bursts and initiates burst connection setup requests to establish a burst connection from the burst reservation packets,
a packet pool temporarily queuing said data, and
an OBS packet scheduler selecting packets of said data from said packet pool to transmit said packets under said burst connection as the outgoing burst; and
a WDM output link outputting said packets selected by said OBS packet scheduler.

2. The system of claim 1, wherein said data or said burst reservation packets contributing to burst formation, and said burst assembler decouples said packet pool from said burst formation.

3. The system of claim 1, wherein said OBS packet scheduler selects a subset of packets of said data to be outputted under said burst connections as the outgoing burst.

4. The system of claim 1, wherein said OBS processor module further comprises a burst transmission controller coupled to said burst assembler for setting up OBS connections and controlling transmission of burst from the OBS processor module.

5. The system of claim 4, wherein the burst transmission controller assigns the packets of said data to the outgoing burst.

6. The system of claim 1, wherein the edge router system treats EPS connections or OCS connections as OBS connections with an infinite length until said EPS connections or said OCS connections are torn down.

7. The system of claim 1, further comprising an EPS processor module for EPS connections; and an OCS processor module for OCS connections, wherein said OBS packet scheduler selects packets outputted under OBS connections, said OCS connections, or said EPS connections based on traffic requirements.

8. The system of claim 1, wherein said edge router system further comprises a connection/ring management module, wherein the connection/ring management module associates packet queues with a specific connection or ring pathway.

9. The system of claim 8, wherein said edge router system sets up one or more dynamic logical mesh connections or ring pathways through one or more core routers for the outgoing burst.

10. The system of claim 9, wherein the ring pathways are dynamically modified according to traffic conditions.

11. The system of claim 1, wherein the burst assembler sends burst scheduling request to OBS wavelength scheduler without prior packet arrivals.

12. The system of claim 1, wherein the burst assembler creates a burst based on a burst reservation packet and sends a burst connection request to the OBS wavelength scheduler.

13. The system of claim 12, wherein the burst assembler associates subset of packets in the packet pool with a certain burst.

14. The system of claim 1, wherein the OBS processor module further comprises a sequence controller, wherein the sequence controller routes packets in sequence when the packets are routed to a same destination router.

15. The system of claim 1, wherein the OBS processor module further comprises an energy controller, wherein the energy controller assembles burst according to energy related metrics to reduce energy consumption.

16. The system of claim 15, wherein the energy controller minimizes optical/electrical/optical conversion.

17. The system of claim 15, wherein the energy controller minimizes route lookup or packet processing incurred on a transmission pathway.

18. The system of claim 1, wherein the OBS processor module further comprises a wavelength scheduler that determines a wavelength for the outgoing burst.

* * * * *